US010099166B2

(12) United States Patent
Sakashita et al.

(10) Patent No.: US 10,099,166 B2
(45) Date of Patent: Oct. 16, 2018

(54) POROUS BODY, HONEYCOMB FILTER, METHOD FOR PRODUCING POROUS BODY, AND METHOD FOR PRODUCING HONEYCOMB FILTER

(71) Applicant: NGK Insulators, Ltd., Nagoya (JP)

(72) Inventors: Satoshi Sakashita, Yokkaichi (JP); Hiroyuki Nagaoka, Kakamigahara (JP)

(73) Assignee: NGK Insulators, Ltd., Nagoya (JP)

( * ) Notice: Subject to any disclaimer, the term of this patent is extended or adjusted under 35 U.S.C. 154(b) by 672 days.

(21) Appl. No.: 14/667,998

(22) Filed: Mar. 25, 2015

(65) Prior Publication Data

US 2015/0273380 A1 Oct. 1, 2015

Related U.S. Application Data

(60) Provisional application No. 61/971,753, filed on Mar. 28, 2014.

(30) Foreign Application Priority Data

Mar. 18, 2015 (JP) ................................ 2015-054365

(51) Int. Cl.
*C04B 38/00* (2006.01)
*C04B 38/06* (2006.01)
(Continued)

(52) U.S. Cl.
CPC ..... *B01D 46/2425* (2013.01); *B01D 46/0001* (2013.01); *B01D 46/2429* (2013.01);
(Continued)

(58) Field of Classification Search
CPC ......................... C04B 2235/6026; C04B 38/00
(Continued)

(56) References Cited

U.S. PATENT DOCUMENTS 5,953,239 A * 9/1999 Teixeira .............. G06F 17/5018 703/2
6,089,744 A * 7/2000 Chen ................... G06F 17/5018 703/2
(Continued)

FOREIGN PATENT DOCUMENTS

EP 2 236 188 A1 10/2010
EP 2 236 189 A1 10/2010
(Continued)

OTHER PUBLICATIONS

Partial European Search Report (Application No. 15160895.7) dated Sep. 10, 2015.
(Continued)

*Primary Examiner* — Erin Snelting
(74) *Attorney, Agent, or Firm* — Burr & Brown, PLLC

(57) ABSTRACT

A porous body constituting a porous partition wall 44 of a honeycomb filter 30 has a porosity P of 20% to 60%, a permeability k of 1 μm² or more and satisfies k≥0.2823 P−10.404. The porous body is obtained by a method for producing, for example, includes (a) a step of acquiring porous body data representing a temporary porous body having porosity higher than target porosity, (b) a step of deriving information about a flow rate for each space voxel during passage of a fluid through inside of the porous body, (c) a step of preferentially replacing the voxel having a low flow rate among the space voxels with the object voxel, and adjusting the porosity of the porous body data to the target porosity, and (d) a step of forming a porous body based on the porous body data after replacement.

16 Claims, 15 Drawing Sheets

(51) Int. Cl.
  B01D 46/24      (2006.01)
  C04B 35/565     (2006.01)
  C04B 35/626     (2006.01)
  C04B 35/636     (2006.01)
  B01D 53/94      (2006.01)
  B01J 35/04      (2006.01)
  B01J 35/10      (2006.01)
  B01D 46/00      (2006.01)
  B29D 99/00      (2010.01)
  C04B 28/24      (2006.01)
  B33Y 10/00      (2015.01)
  B33Y 80/00      (2015.01)
  C04B 111/00     (2006.01)

(52) U.S. Cl.
  CPC .......... *B01D 53/94* (2013.01); *B01J 35/04* (2013.01); *B01J 35/10* (2013.01); *B29D 99/0089* (2013.01); *C04B 28/24* (2013.01); *C04B 35/565* (2013.01); *C04B 35/62625* (2013.01); *C04B 35/6365* (2013.01); *C04B 38/0006* (2013.01); *C04B 38/009* (2013.01); *C04B 38/06* (2013.01); *B01D 2046/2433* (2013.01); *B01D 2046/2496* (2013.01); *B33Y 10/00* (2014.12); *B33Y 80/00* (2014.12); *C04B 2111/0081* (2013.01); *C04B 2111/00793* (2013.01); *C04B 2235/3826* (2013.01); *C04B 2235/428* (2013.01); *C04B 2235/606* (2013.01); *C04B 2235/6022* (2013.01); *C04B 2235/6026* (2013.01)

(58) Field of Classification Search
  USPC ............. 700/105, 118, 119; 703/2, 7, 9
  See application file for complete search history.

(56) References Cited

U.S. PATENT DOCUMENTS

| | | | |
|---|---|---|---|
| 7,451,067 B2 * | 11/2008 | Itou | G06F 17/5018 428/30 |
| 7,452,591 B2 | 11/2008 | Tabuchi et al. | |
| 7,488,366 B2 | 2/2009 | Furukawa et al. | |
| 7,584,086 B2 * | 9/2009 | Frankel | E21B 43/00 703/10 |
| 7,668,705 B2 * | 2/2010 | Kalitzin | G06F 17/5018 703/2 |
| 8,173,054 B2 | 5/2012 | Tabuchi et al. | |
| 8,893,371 B2 * | 11/2014 | Barlier | G05B 19/4099 249/81 |
| 2006/0135343 A1 | 6/2006 | Ohno et al. | |
| 2007/0048494 A1 | 3/2007 | Miyairi et al. | |
| 2010/0222209 A1 * | 9/2010 | Kashani-Shirazi | B01J 8/067 502/159 |
| 2011/0129640 A1 * | 6/2011 | Beall | B28B 1/001 428/116 |
| 2011/0295580 A1 * | 12/2011 | Sisk | G01N 33/24 703/10 |
| 2012/0102706 A1 * | 5/2012 | Gallagher | B01D 53/22 29/428 |
| 2013/0116997 A1 * | 5/2013 | Sun | G06F 17/5018 703/9 |
| 2014/0065350 A1 * | 3/2014 | Kobashi | B01D 46/2425 428/116 |
| 2014/0343858 A1 * | 11/2014 | Crouse | E21B 49/00 702/13 |
| 2015/0053627 A1 * | 2/2015 | Silin | B01D 29/00 210/767 |
| 2015/0107206 A1 | 4/2015 | Sakashita et al. | |
| 2015/0165690 A1 * | 6/2015 | Tow | B33Y 80/00 700/119 |
| 2015/0299054 A1 * | 10/2015 | Ogunwumi | C04B 35/14 55/529 |
| 2016/0023375 A1 * | 1/2016 | Uram | B29C 39/36 264/133 |

FOREIGN PATENT DOCUMENTS

| | | |
|---|---|---|
| EP | 2 669 667 A1 | 12/2013 |
| JP | 2005-114612 A1 | 4/2005 |
| JP | 4398260 | 10/2009 |
| JP | 4805676 | 8/2011 |
| JP | 5064432 B2 | 10/2012 |
| JP | 2012-214365 A1 | 11/2012 |
| WO | 2006/001509 A1 | 1/2006 |
| WO | WO2013/146499 A1 | 10/2013 |

OTHER PUBLICATIONS

Extended European Search Report (Application No. 15160895.7) dated Feb. 11, 2016.
Andreas Wiegmann et al., "Soot Filtration Simulation—Generation of Porous Media on the Micro Scale from Soot Deposition on the Nano Scale," Proceedings of the 2nd European Conference on Filtration and Separation, Compiegne, France, Oct. 1, 2006, pp. 141-147.
Mark Parish et al., "Ceramic Filter Elements with Tailored Macro- and Microstructures," *Filtration and Separation*, Advanced Technology, vol. 32, No. 1, Jan. 1, 1995, pp. 31, 33 and 35.
Extended European Search Report (Application No. 16161325.2) dated Jun. 15, 2016.
Japanese Office Action (Application No. 2015-054365) dated Jul. 31, 2018 (with English translation).
Notification bearing a dated of Sep. 11, 2018 from a corresponding Japanese patent application (JP 2015-054365), 2 pages.

* cited by examiner

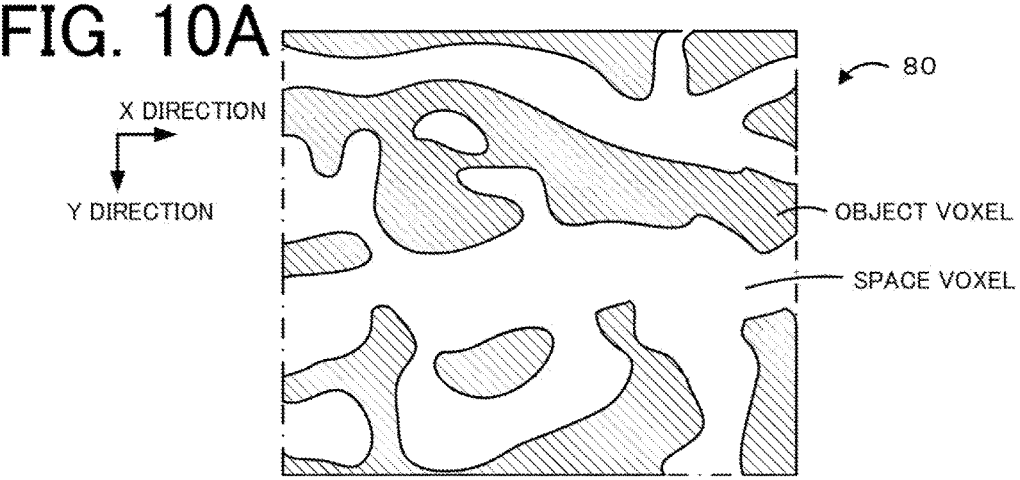
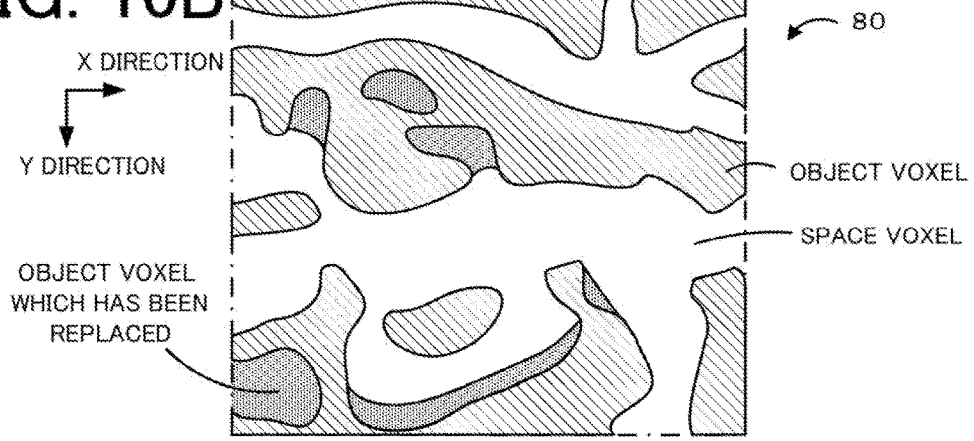
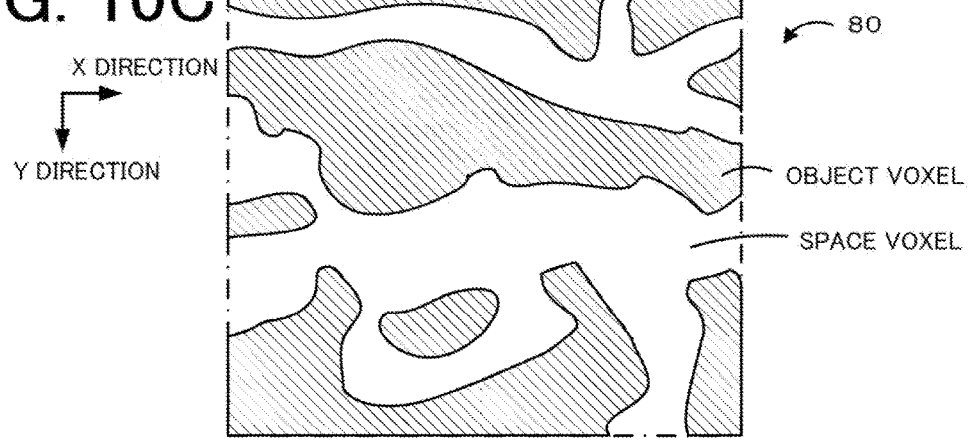

STRAIGHT LINE A: k=0.2823P−10.404
STRAIGHT LINE B: k=0.1627P−0.4955
STRAIGHT LINE C: k=0.1627P−3.0

US 10,099,166 B2

POROUS BODY, HONEYCOMB FILTER, METHOD FOR PRODUCING POROUS BODY, AND METHOD FOR PRODUCING HONEYCOMB FILTER

The present application claims priority from U.S. Provisional Application No. 61/971,753 filed on Mar. 28, 2014, and Japanese Patent Application No. 2015-054365 filed on Mar. 18, 2015, the entire contents of which are incorporated herein by reference.

BACKGROUND OF THE INVENTION

1. Field of the Invention

The present invention relates to a porous body, a honeycomb filter, a method for producing a porous body, and a method for producing a honeycomb filter.

2. Description of the Related Art

It is known to use porous bodies as honeycomb filters which purify exhaust gas. For example, Patent Literature 1 describes a method for producing a porous body by mixing ceramic particles, fine particles, and a sintering aid to prepare a dough, molding the dough to form a compact, and firing the compact at a predetermined temperature. It is also descried that the method for producing a porous body can produce a porous body in which an increase in pressure loss is suppressed by adjusting an average particle diameter of the ceramic particles to a value within a predetermined range.

CITATION LIST

Patent Literature

[PTL 1] International Publication No. 2006/001509

SUMMARY OF THE INVENTION

Such porous bodies preferably have as low permeation resistance (pressure loss per unit thickness) as possible. Also, the porous bodies preferably have as low porosity as possible because the porous bodies have higher heat capacity and higher heat uniformity. However, the pore volumes of the porous bodies decrease as the porosity decreases, and thus the permeation resistance tends to increase. Therefore, it is difficult to sufficiently decrease both the porosity and the permeation resistance of porous bodies. Similarly, the porous bodies preferably have as high permeability as possible, but it is difficult to sufficiently decrease the porosity and increase the permeability of the porous bodies. That is, it is difficult to sufficiently decrease the porosity and increase the permeation property (low permeation resistance or high permeability) of the porous bodies.

The present invention has been achieved for solving the problem, and a main object is to sufficiently decrease the porosity and increase the permeation property of a porous body.

The present invention uses a method below for achieving the object described above.

A first porous body of the present invention has a porosity P of 20% to 60%, a permeability k of 1 $\mu m^2$ or more, and satisfies k≥0.2823 P−10.404.

The first porous body of the present invention has a porosity of 20% to 60%, a permeability k of 1 $\mu m^2$ or more, and satisfies k≥0.2823 P−10.404, thus the porosity of the porous body is sufficiently decreased and permeability is increased. Thus, the porosity of the porous body is sufficiently decreased and permeation property is increased. The first porous body of the present invention can be produced by, for example, a method for producing a porous body of the present invention described below.

The first porous body of the present invention may satisfy k≤0.1627 P−0.4955. The first porous body of the present invention nay satisfy k≥0.1627 P−3.0. Also, the first porous body of the present invention may haste a porosity P of 25% or more, 30% or more, or 50% or less. The first porous body of the present invention preferably has a permeability k of 2 $\mu m^2$ or more. The first porous body of the present invention may have a permeability k of 10 $\mu m^2$ or less or 9 $\mu m^2$ or less. The first porous body of the present invention tray have a permeation resistance of 100 Pa/mm or less.

A second porous body of the present invention has a porosity of 25% to 50% and a permeation resistance of 100 Pa/mm or less.

The second porous body of the present invention has a porosity of 25% to 50% and a permeation resistance of 100 Pa/mm or less, and thus both the porosity and permeation resistance of the porous body are sufficiently decreased. Thus, the porosity of the porous body is sufficiently decreased and permeation property is increased. The second porous body of the present invention can be produced by, for example, a method for producing a porous body of the present invention described below.

A first honeycomb filter of the present invention includes a porous partition wall which comprises the first porous body of the present invention and forms a plurality of cells serving as flow passages of a fluid, one of the ends of each of the cells being opened and the other end being sealed.

In the first honeycomb filter of the present invention, the porous body constituting the porous partition wall has porosity and permeability k within the respective above-described ranges, and thus the porosity is sufficiently decreased and permeation property is increased. The first honeycomb filter of the present invention can be produced by, for example, a method for producing a honeycomb filter of the present invention described below.

A second honeycomb filter of the present invention includes a porous partition wall which includes the porous body of the present invention and forms a plurality of cells serving as flow passages of a fluid, one of the ends of each of the cells being open and the other end being sealed.

In the second honeycomb filter of the present invention, the porous body constituting the porous partition wall has porosity and permeation resistance within the respective above-described ranges, and thus both the porosity and permeation resistance are sufficiently decreased. Thus, the porosity is sufficiently decreased and the permeation property is increased. The second honeycomb filter of the present invention can be produced by, for example, a method for producing a honeycomb filter of the present invention described below.

A method for producing a porous body of the present invention includes:

(a) a step of acquiring porous body data which is data representing a temporary porous body having porosity higher than target porosity, and which associates position information indicating a three-dimensional position of a voxel with voxel type information containing information capable of discriminating whether the voxel is a space voxel representing space or object voxel representing object;

(b) a step of deriving information about a flow rate for each space voxel during passage of a fluid through inside of the porous body represented by the porous body data by performing fluid analysis based on the porous body data;

(c) a step of preferentially replacing the voxel having a low flow rate among the space vessels in the porous body data with the object voxel based on the information about a flow rate, and adjusting the porosity of the porous body data to the target porosity; and (d) a step of forming a porous body basal on the porous body data after replacement.

The method for producing a porous body of the present invention includes acquiring porous body data which represents a temporary porous body having porosity higher than target porosity, and performing fluid analysis based on the porous body data to derive information about a flow rate for each space voxel. Then, the space voxel having a low flow rate among the space voxel in the porous body data is preferentially replaced with the object voxel based on the derived information about a flow rate, adjusting the porosity of the porous body data to the target porosity. Therefore, the space voxel having a low flow rate, that is, the space voxel representing a pore which does not relatively contribute to permeation of a fluid, can be preferentially replaced with the object voxel. Therefore, even when the porosity of the porous body data is decreased (brought near to the target porosity) by replacing the space voxel with the object voxel, the permeation property of a porous body represented by the porous body data after replacement is little decreased. Therefore, a porous body represented by the porous body data after replacement is one in which an decrease in permeation property is further suppressed while the porosity of the temporary porous body used as an origin is decreased to the target porosity, and thus the porosity is sufficiently decreased and the permeation property is increased. Thus, by forming a porous body based on the porous body data after replacement, a porous body having porosity which is sufficiently decreased and permeation property which is increased can be produced. For example, a porous body having porosity which is sufficiently decreased and permeability which is increased, or a porous body having porosity and permeation resistance both of which are sufficiently decreased can foe produced.

The "temporary porous body" may be an existing porous body or non-existing porous body. That is, the porous body data acquired in the step (a) may be data based on an image obtained by three-dimensional scanning of an existing temporary porous body or data formed by, for example, using a computer because the existing temporary porous body is not present. Alternatively, the porous body data acquired in the step (a) may be data obtained by further processing the porous body data based on three-dimensional scanning. In addition, "fluid analysis" may be analysis according to, for example, a lattice Boltzmann method. Also, fluid analysis may be fluid analysis perfumed when a fluid flows from a predetermined inflow surface of a porous body represented by the porous body data or fluid analysis performed when a fluid flows from a predetermined inflow surface to a predetermined outflow surface of the porous body. The "flow rate for each voxel" may be a vector quantity or a scalar quantity. The expression "adjusting the porosity of the porous body data to the target porosity" represents that the porosity of the porous body data is allowed to coincide with the target porosity and that the porosity of the porous body data is brought into a predetermined allowable region around the target porosity.

In the method for producing a porous body of the present invention, the target porosity may be 20% to 60%. In this case, the porosity of the produced porous body can be easily adjusted to, for example, 20% to 60%, and thus the porosity of the produced porous body can be sufficiently decreased. The target porosity may be 25% to 50%.

In the method for producing a porous body of the present invention, in the step (c), the voxel having a low flow rate among the space voxels adjacent to the object voxel may be preferentially replaced with the object voxel. In this case, when the space voxel not adjacent to any object voxel is replaced with the object voxel, the object voxel after replacement may be brought into a state of floating in the air in the porous body. The porous body having such a shape cannot be easily actually formed. This can be avoided by replacing the space voxel adjacent to the object voxel, and the porous body based on the porous body data in the step (c) can be easily produced.

In the method for producing a porous body of the present invention, in the step (c), the voxel having the lowest flow rate may be first replaced with the object voxel. In this case, the voxel representing a pore which least contributes to permeation of a fluid is replaced with the abject voxel, and thus the permeation property of the porous body represented by the porous body data after replacement is less decreased. Therefore, the permeation property of the produced porous body has higher permeation property. For example, the permeability of the produced porous body has higher permeability, or the permeation resistance has lower permeation resistance.

In the step (d) of the method for producing a porous body of the present invention, the porous body based on the porous body data after replacement may be formed directly by a three-dimensional shaping method. This enables relatively simple formation of the porous body based on the porous body data.

In the method for producing a porous body of the present invention, the step (d) may include a step (d1) of forming a reverse porous body in which the space voxel is taken as object and the object voxel is taken as space by a three-dimensional shaping method based on the porous body data after replacement, a step (d2) of forming a green porous body by filling the spaces of the reverse porous body with a raw material slurry of the porous body, and step (d3) of burning out the reverse porous body by firing the green porous body to form the porous body. Consequently, for example, even when a porous body based on the porous body data cannot be directly formed by a three-dimensional shaping method using a raw material of the porous body, the porous body based on the porous body data can be formed.

A method for producing a honeycomb filter of the present invention uses the method for producing a porous body of the present invention in the embodiment of forming the reverse porous body.

In the step (c), porous partition wall data is formed based on the porous body data after replacement, the porous partition wall data being data representing a porous partition wall which forms a plurality of cells serving as flow passages of a fluid, and associating the position information with the voxel type information.

In the step (d1), a reverse porous partition wall in which the space voxel is taken as object and the object voxel is taken as space is formed by the three-dimensional shaping method basal on the porous partition wall data.

In the step (d2), a green porous partition wall is formed by filling the spaces of the reverse porous partition wall with the raw material slurry.

In the step (d3), the reverse porous partition wall is burned out by firing the green porous partition wall to form a porous partition wall which forms the cells each having open both ends.

The step (d) includes a step (d4) of forming a sealed portion in each of the plurality of cells of the formed porous partition wall so that the cell in which one of the ends is opened and the other is sealed and the cell in which one of the ends is sealed and the other is opened are alternately arranged.

In the method for producing a honeycomb filter of the present invention, porous partition wall data representing a porous partition wall which forms cells serving as flow passages of a fluid is formed based on the porous body data after replacement. Then, a reverse porous partition wall in which the space (pore and cell) portion forms the object is formed based on the porous partition wall data. Then, the reverse porous partition wall is burned off to form the porous partition wall which forms the cells each having open both ends. Therefore, not only the pores but also the cell portion in the porous body are formed in the reverse porous partition wall which is then burned off, and thus a honeycomb filter can be produced by forming the porous partition wall using the same method as for producing a porous body of the present invention. Therefore, like in the method for producing a porous body of the present invention described above, a honeycomb filter including a porous partition wall having porosity which is sufficiently decreased and permeation property which is increased can be produced. For example, a honeycomb filter including a porous partition wall having porosity which is sufficiently decreased and permeability which is increased or a honeycomb filter including a porous partition wall having porosity and permeation resistance which are both sufficiently decreased can be produced.

BRIEF DESCRIPTION OF THE DRAWINGS

FIG. 10A, FIG. 10B and FIG. 10C are explanatory views showing space voxel replacement processing.

DESCRIPTION OF THE PREFERRED EMBODIMENTS

An embodiment for carrying out the present invention is described with reference to the drawings.

Figure 1:
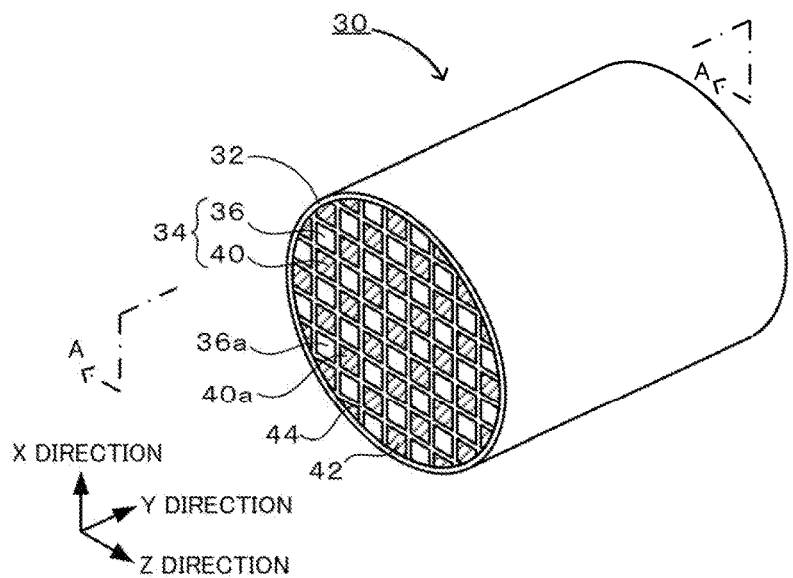
FIG. 1 is a perspective view showing a honeycomb filter 30 according to an embodiment of the present invention.
Figure 2:
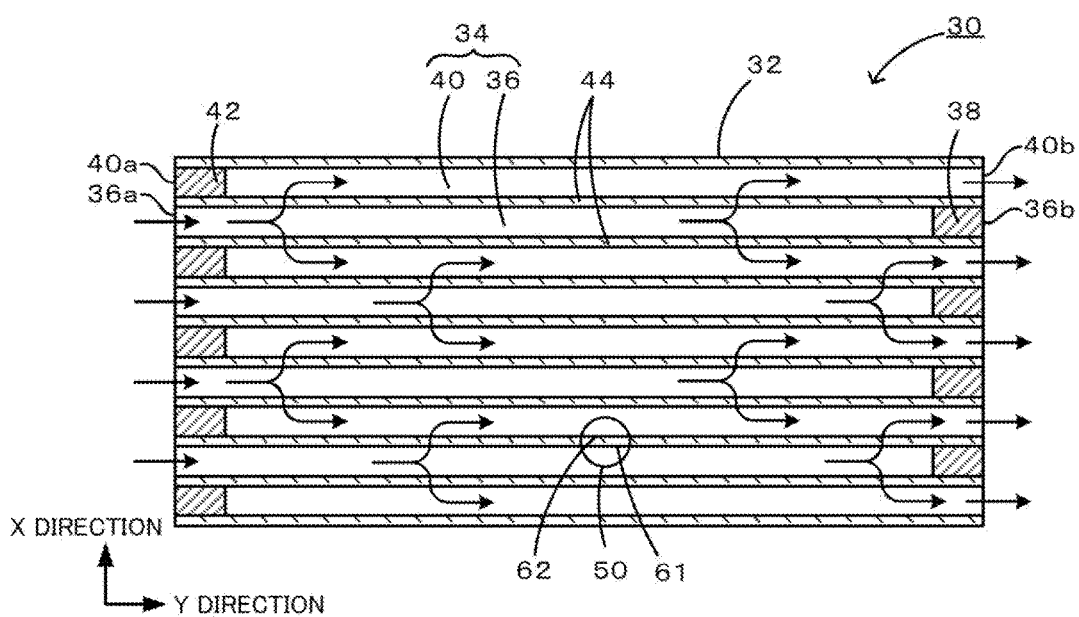
FIG. 2 is a sectional view taken along line A-A in FIG. 1.

FIG. 1 is a perspective view showing a honeycomb filter 30 including a porous partition wall 44 as a porous body according to an embodiment of the present invention, and FIG. 2 is a sectional view taken along line A-A in FIG. 1. The honeycomb filter 30 is a diesel particulate filter (DPF) having the function of filtering out particulate matter (PM) from exhaust gas of a diesel engine. The honeycomb filter 30 includes many cells 34 (refer to FIG. 2) partitioned by the porous partition wall 44, and a periphery protecting portion 32 is formed on the periphery of the honeycomb filter 30. In view of strength and heat resistance, a material of the porous partition wall 44 is preferably a ceramic material composed of inorganic particles of Si-bond SiC, cordierite, or the like. The thickness of the porous partition wall 44 is preferably 200 μm or more and less than 600 μm, and in the embodiment, the thickness is 300 μm. For example, the porous partition wall 44 has an average pore diameter (mercury press-injection method) of 10 μm or more and less than 60 μm. As shown in FIG. 2, the many cells 34 formed in the honeycomb filter 30 include inlet-open cells 36 each having an inlet 36a opened and an outlet 36b sealed with an outlet sealing material 38 and outlet-open cells 40 each having an inlet 40a sealed with an inlet sealing material 42 and an outlet 40b opened. The inlet-open cells 36 and the outlet-open cells 40 are alternately provided to be adjacent to each other. The cell density is, for example, 15 cells/cm$^2$ or more and less than 65 cells/cm$^2$. The periphery protecting portion 32 is a layer which protects the periphery of the honeycomb filter 30 and may contain the inorganic particles as described above, inorganic fiber of aluminosilicate, alumina, silica, zirconia, ceria, mullite, or the like, and a bonding material such as colloidal silica, clay, or the like.

The honeycomb filter 30 is mounted on, for example, the downstream side of a diesel engine not shown and is used for purifying exhaust gas containing PM and discharging the gas to the air. In FIG. 2, an arrow indicates a flow of exhaust gas. The exhaust gas containing PM from a diesel engine flows in the inlet-open cells 36 through the inlets 36a of the honeycomb filter 30, passes through the porous partition wall 44, flows in the adjacent outlet-open cells 40, and is discharged to the air through the outlets 40b of the outlet-open cells 40. In this case, PM is captured when the exhaust gas containing PM flows in the outlet-open cells 40 from the inlet-open cells 36 through the porous partition wall 44, and thus the exhaust gas flowing in the outlet-open cells 40 becomes clean exhaust gas not containing PM. Also, the insides of pores in the porous partition wall 44 are coated with an oxidation catalyst such as platinum not shown. Therefore, the captured PM is oxidized, thereby preventing a decrease in porosity of the porous partition wall 44 and an abrupt increase in pressure loss.

The porous partition wall 44 in the embodiment includes a porous body constituting the porous partition wall 44 and having a porosity of 25% to 50% and a permeation resistance of 100 Pa/mm or less, and both the porosity and the permeation resistance are sufficiently decreased. The porosity may be 40% or less. In addition, the permeation resistance is preferably as low as possible and may be, for example, 30 Pa/mm or more.

Next, a method for producing the honeycomb filter 30 including the porous partition wall 44 according to the embodiment is described. A method for producing the porous partition wall 44 includes (a) the step of acquiring porous body data 60 which is data representing a temporary porous body having porosity higher than target porosity, and which associates position information indicating a three-dimensional position of a voxel with voxel type information containing information capable of discriminating whether the voxel is a space voxel representing a space or an object voxel representing an object; (b) the step of performing fluid analysis based on porous body data 80 to derive information about a flow rate for each space voxel during passage of a fluid through in side of a porous body represented by the porous body data 80; (c) the step of preferentially replacing the space voxel having a low flow rate among the space voxel in the porous body data with the object voxel in the porous body data 80 based on the information about a flow rate and adjusting the porosity of the porous body data 80 to the target porosity; and (d) the step of forming a porous body based on the porous body data 80 after replacement.

Figure 3:
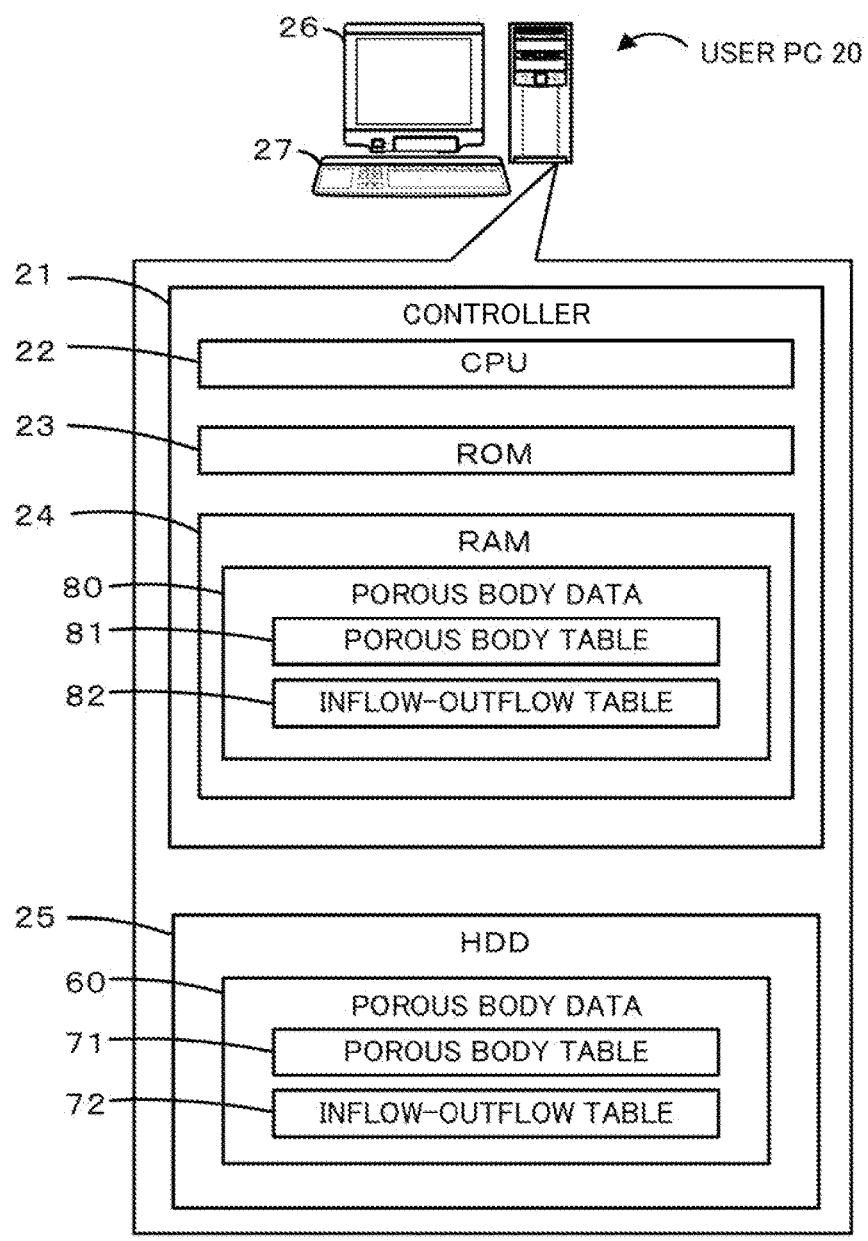
FIG. 3 is a block diagram schematically showing a configuration of a user personal computer (PC) 20.

The steps (a) to (c) are performed by using a user personal computer (PC) 20 configured as a porous body data processor. FIG. 3 is a block diagram schematically showing a configuration of the user personal computer (PC) 20. The user PC 20 includes a controller 21 including CPU 22 which executes various types of processing, ROM 23 which stores various processing programs, and RAM 24 which temporarily stores data, and HDD 25 serving as a high-capacity memory which stores various processing programs such as an analysis processing program, and various data such as the porous body data 60 which is three-dimensional voxel data of the porous body. In addition, the user PC 20 includes a display 26 which displays various information on a screen, and an input device 27 such as a key board in which the user inputs various instructions.

Figure 4:
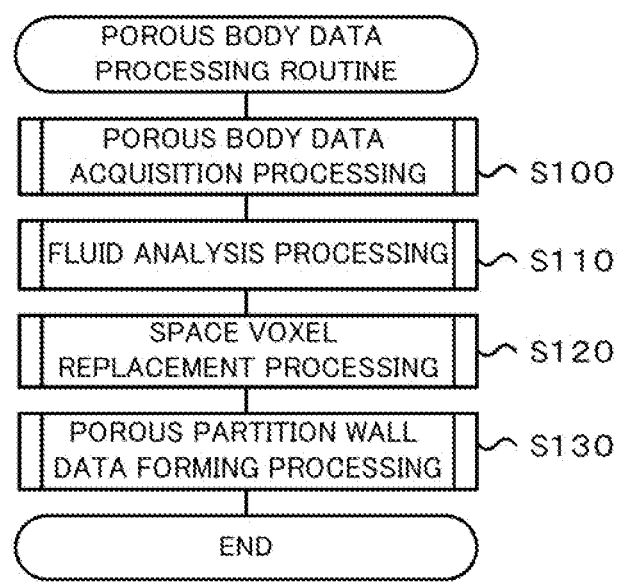
FIG. 4 is a flow chart showing an example of a porous body data processing routine.

Next, the steps (a) to (c) performed by using the user PC 20 are described. FIG. 4 is a flow chart of a porous body data processing routine. The porous body data processing routine is performed by the CPU 22 which executes the processing program stored in the HDD 25 when the user instructs processing through the input device 27.

When the porous body data processing routine is executed, the CPU 22 reads out and acquires the porous body data 60 stored in the HDD 25 in the step (a) and stores the data as the porous body data 80 in the RAM 24 (Step S100).

Here, the porous body data 60 is described. The porous body data 60 is data which represents a porous body (hereinafter referred to as a "temporary porous body") having porosity higher than target porosity described below. Also, the permeation resistance of the temporary porous body is smaller than target permeation resistance (for example, any value of 100 Pa/mm or less). In the embodiment, the porosity of the temporary porous body is about 50% to 60%, and the permeation resistance thereof is less than 100 Pa/mm. The porous body data 60 is three-dimensional voxel data obtained by CT scanning of a honeycomb filter including a porous partition wall (=temporary porous partition wall) having the same shape as the honeycomb filter 30. Also, in description using the honeycomb filter 30 shown in FIG. 2, the porous body data 60 of the embodiment corresponds to data obtained by photographing the porous partition wall 44 in a region 50 shown in FIG. 2. Specifically, CT scanning is performed by photographing a plurality of photographic cross-sections of the region 50 in the Z direction shown in FIG. 2, each of the photographic cross-sections being an XY plane represented by the X direction and the Y direction, thereby forming the voxel data. In the embodiment, the resolution in each of the X, Y, and Z directions is 1.2 μm, and the resultant cube having a side of 1.2 μm becomes a minimum unit, i.e., a voxel, of the three-dimensional voxel data. In addition, the resolution in each of the X, Y, and Z directions can be appropriately determined, for example, according to the performance of a CT photography apparatus and the size of particles to be analyzed. Also, the values of resolution in the X, Y, and Z directions may be different from each other. The resolution in each of the X, Y, and Z directions is not particularly limited but may be determined to, for example, a value within a range of 0.5 μm to 3.0 μm. The position of each voxel is represented by X, Y, Z coordinates (a coordinate value of 1 corresponds to a side length of 1.2 μm of a voxel) and the type information to specify whether the voxel is a space (pore) or an object (the constituting material of the porous partition wall 44) is added. Both the position information and the type information are stared in the HDD 25. In the embodiment, a value of 0 is added as the type information to a voxel (space voxel) representing a space, and a value of 9 is added as the type information to a voxel (object voxel) representing an object. In fact, the data obtained by CT scanning is, for example, luminance data of each (X, Y, Z) coordinate position. The porous body data used in the embodiment can be obtained by binarizing the luminance data with a predetermined threshold value and determining whether a voxel is the space voxel or the object voxel for each (X,Y,Z) coordinate position. The threshold value is a value determined as a value which permits proper discrimination between the space voxel and the object voxel. The threshold value may be previously determined by, for example, an experiment so that the measured porosity of the porous partition wall 44 is substantially equal to the porosity in the voxel data after binarization. Also, the CT scanning can be performed by using, for example, SMX-160CT-SV3 manufactured by Shimadzu Corporation.

Figure 5A:
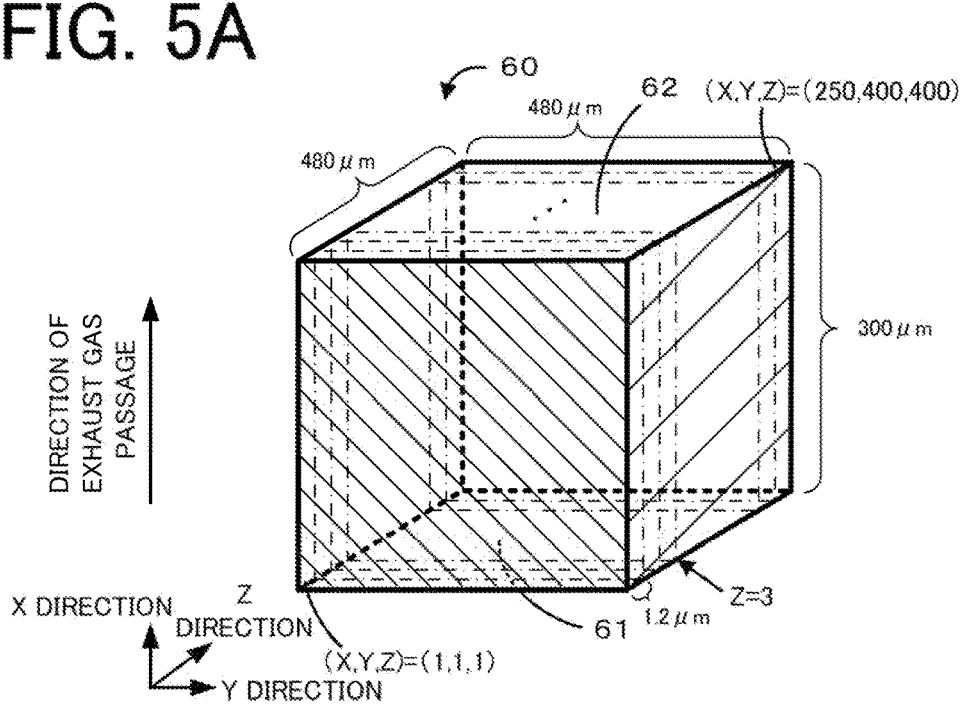
FIG. 5A and FIG. 5B are conceptual views of porous body data 60.
Figure 5B:
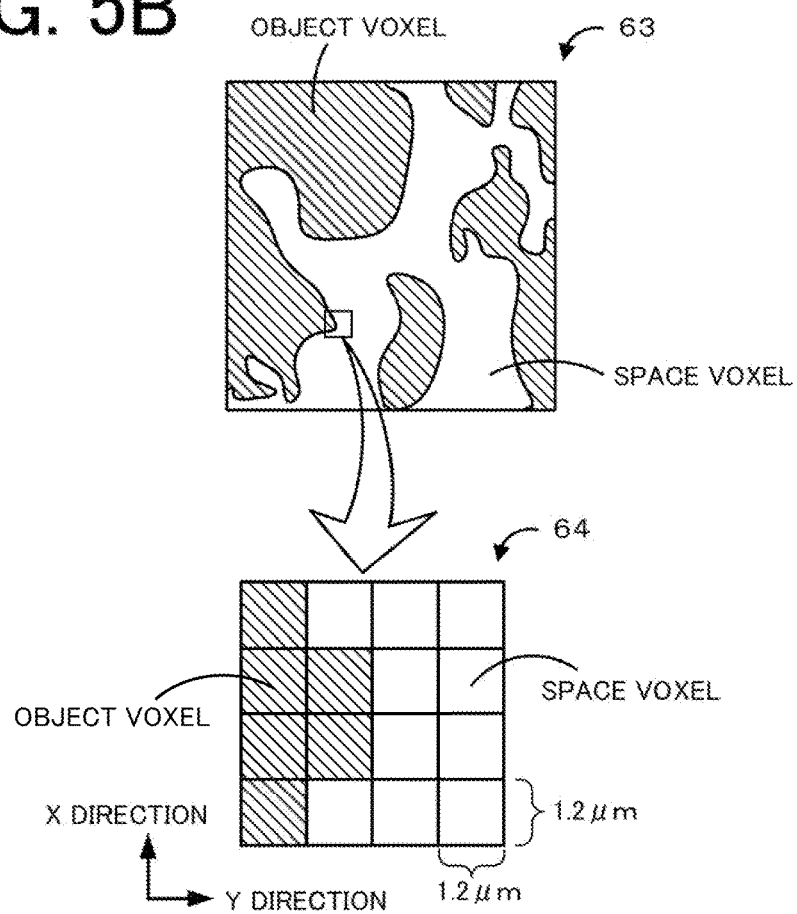
Figure 6:
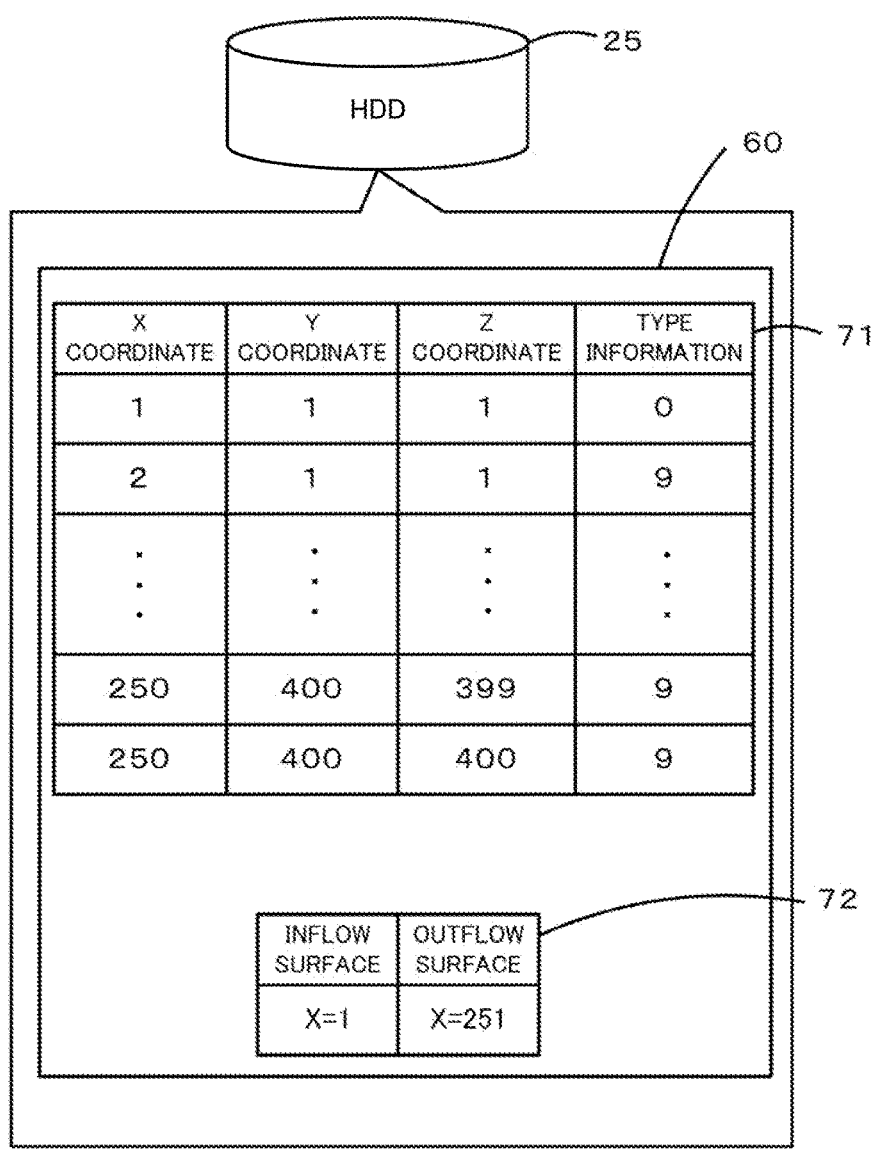
FIG. 6 is an explanatory view of porous body data 60.

FIG. 5A and FIG. 5B are conceptual views of the porous body data 60. In the embodiment, the porous body data 60 is obtained by extracting, as a part of voxel data of the porous partition wall 44, voxel data of a rectangular parallelepiped portion having a X-direction length of 300 μm (=1.2 μm×250 voxels) which is the same value as the thickness of the porous partition wall 44 in the direction of exhaust gas passage, a Y-direction length of 480 μm (=1.2 μm×400 voxels), and a Z-direction length of 480 μm (=1.2 μm×400 voxels). The size of the porous body data 60 can be appropriately determined according to the thickness and size of the porous partition wall 44, and allowable computational load. The X-direction length is preferably the same value as the thickness of the porous partition wall 44 in the direction of exhaust gas passage but may be a different value. Also, the Y-direction and Z-direction lengths are not limited to 480 μm and may be another value, and the Y-direction and Z-direction lengths may be different from each other. With respect to the porous body data 60, among the six faces of a rectangular parallelepiped, two faces (faces parallel to a Y-Z plane) correspond to an Inflow surface 61 (refer to FIG. 2) at the boundary surface between the porous partition wall 44 and the inlet-open cell 36 and an outflow surface 62 (refer to FIG. 2) at the boundary surface between the porous partition wall 44 and the outlet-open cell 40 in the region 50, the remaining four faces corresponding to cross-sections of the porous partition wall 44. With respect to the porous body data 60, the inflow surface 61 is a surface in which exhaust gas flows from the inlet-open cell 36 side. Therefore, the inflow surface 61 is not limited to the boundary surface between the porous partition wall 44 and the inlet-open cell 36 and may be any surface parallel to the boundary surface between the porous partition wall 44 and the inlet-open cell 36. With respect to the porous body data 60, the outflow surface 62 is a surface from which exhaust gas flows out to the outlet-open cell 40 side. The outflow surface 62 is not limited to the boundary surface between the porous partition wall 44 and the outlet-open cell 40 and may be any surface parallel to the boundary surface between the porous partition wall 44 and the outlet-open cell 40. FIG. 5B shows a XY plane (photographic cross-section) 63 at a Z-coordinate value of 3 in the porous body data 60 and a partial enlarged view 64 thereof. As shown in the enlarged view 64, the XY plane 63 includes an arrangement of voxels having a side of 1.2 μm, and each of the voxels is shown as either the space voxel or the object voxel. Data of a photographic cross-section obtained by CT scanning is data of a plane (data of pixel) without a thickness in the Z direction, but each photographic cross-section is handled as having a thickness corresponding to an interval (=1.2 μm) of photographic cross-sections in the Z-direction, that is, each voxel is handled as a cube having a side of 1.2 μm as described above. As shown in FIG. 6, the porous body data 60 is stored, in the HDD 25, as data including a porous body table 71 in which (XYZ) coordinates as the position information are associated with the type information of each voxel, and an inflow-outflow table 72 showing the inflow surface 61 and the outflow surface 62. In the inflow-outflow table 72 in FIG. 6, "X=1" represents a plane at X=1 in the XYZ coordinate system and thus represents the inflow surface 61 as shown in FIG. 5A. Similarly, "X=251" represents the outflow surface 62. In addition, not only the porous body data 60 but also a plurality of items of other porous body data showing voxel data of the porous partition wall 44 other than the region 50 may be stored in the HDD 25.

In the step (a) (Step S100 in FIG. 4), the CPU 22 reads the porous body data 60 including the porous body table 71 and the inflow-outflow table 72 stored in the HDD 25 and acquires the porous body data 60, and stored the data as the porous body data 80 including a porous body table 81 and an inflow-outflow table 82 in the RAM 24.

Figure 7:
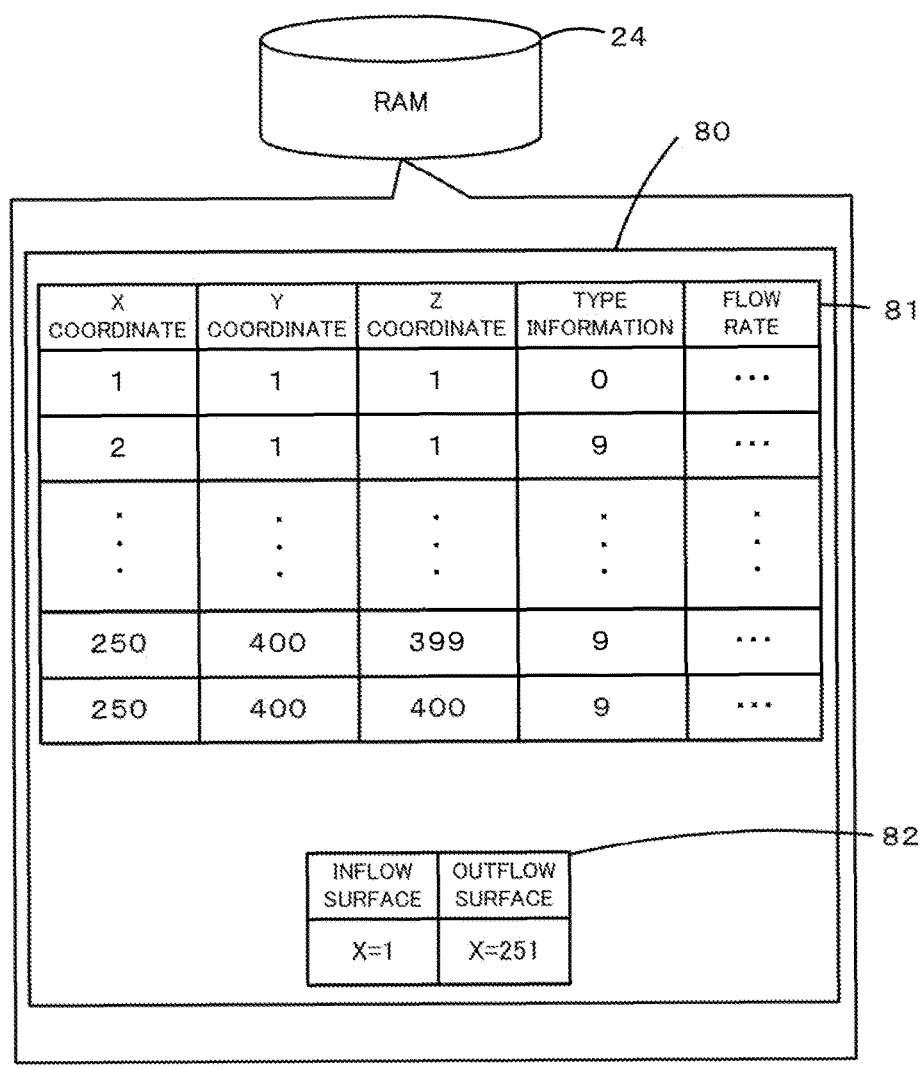
FIG. 7 is an explanatory view of porous body data 80 after flow rate vectors are associated with a porous body table 81.

Then, in the step (b), the CPU 22 performs fluid analysis processing to derive information about a flow rate of each space voxel during passage of a fluid through inside of the porous body based on the porous body data 80 stored in the RAM 24 (Step S110). The fluid analysis processing is performed by a known lattice Boltzmann method. Specifically, the fluid analysis processing is performed by the Boltzmann method in which the center of each voxel of the porous body data 80 is regarded as each lattice point, and when a fluid flows from the inflow surface 61, a predetermined relational formula concerning a fluid flow between each lattice point and a lattice point adjacent thereto is used. Then, a flow rate vector formed by a flow rate and flow direction is derived as information about the flow rate of each space voxel of the porous body data 80, and the flow rate vector of each space voxel is stored to be associated with the porous body table 81 of the porous body data 80 in the RAM 24. FIG. 7 is an explanatory view of the porous body data 80 after the flow rate vector is associated with the porous body table 81. The fluid analysis is performed by using numerical values required for the analysis, such as average flow rate $T_{in}$ of the fluid at the inflow surface 61, viscosity μ of the fluid, density ρ of the fluid, etc., which are previously determined in, for example, the HDD 25. These numeral values may be values determined by the user through the input device 27. The average flow rate $T_{in}$ is an average value of flow rates immediately before the fluid enters the porous body and corresponds to an initial value of flow rates in the fluid analysis. In the embodiment, the average flow rate $T_{in}$ is 0.01 m/s. In addition, assuming that the fluid is the air at 0° C. and 1 atom, the viscosity μ is $1.73 \times 10^{-5}$ Pa·s, and the density ρ is 1.25 kg/m$^3$. These numerical values can be appropriately determined, for example, based on the fluid estimated to be actually flowed in the honeycomb filter 30.

Figure 8:
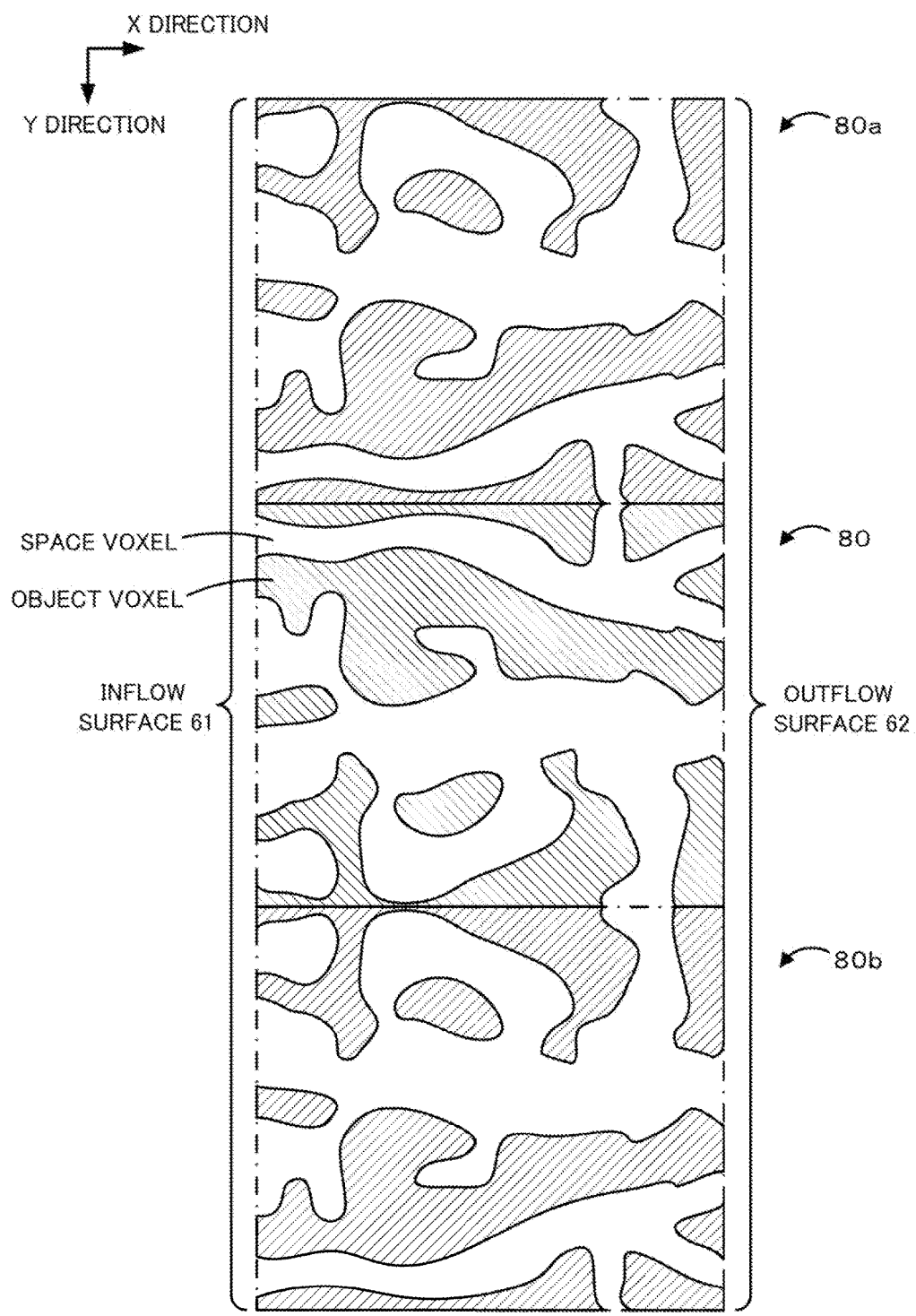
FIG. 8 is an explanatory view of porous body data 80 and adjacent porous body data 80a and 80b used in fluid analysis.

Also, in the embodiment, the CPU 22 performs fluid analysis processing in Step S110 on the assumption that porous body data which is plane-symmetric with the porous body data 80 for the analysis is adjacent to each of surfaces other than the inflow surface 61 and the outflow surface 62 in the porous body data 80. FIG. 8 is an explanatory view showing the porous body data 80 and porous body data 80a and 80b adjacent to the porous body data 80 for the fluid analysis. For convenience of description, FIG. 8 shows a cross-section on the XY plane in the porous body data 80 etc. In FIG. 8, the inflow surface 61 is located on the left side of the porous body data 80 (at the middle in FIG. 8) for the analysis, and the outflow surface 62 is located on the right side. In the fluid analysis processing in Step S110, the porous body data 80a is assumed to be present adjacent to the upper surface (XZ plane) of the porous body data 80. The porous body data 80a is data of space voxels and object voxels which are arranged plane-symmetrically (longitudinally symmetrically in FIG. 8) with the porous body data 80 with respect to a contact surface. Similarly, the porous body data 80b plane-symmetric (longitudinally symmetric in FIG. 8) with the porous body data 80 with respect to a contact surface is assumed to be present adjacent to the lower surface (XZ plane) of the porous body data 80. Although not shown in the drawing, porous body data plane-symmetric with the porous body data 80 with respect to a contact surface is present on each side of the porous body data 80 in the Z direction. That is, in Step S110, the fluid analysis processing is performed for data (porous body data 80×5) containing the porous body data 80 and four porous body data adjacent to the porous body data 80 in the Y direction and the Z direction. In addition, as shown in FIG. 8, the inflow surface 61 and the outflow surface 62 are set for the porous body data 80a, 80b, etc. plane-symmetric with the porous body data 80.

Therefore, the fluid can flow between the adjacent porous body data for pores (for example, pores open in the upper surface and the lower surface in FIG. 8) open in surfaces other than the inflow surface 61 and the outflow surface 62 among the pores (spaces) represented by the space voxels in the porous body data 80, thereby permitting more proper fluid analysis. That is, when the fluid analysis is performed only with the porous body data 80 without considering the porous body data adjacent to the porous body data 80, pores open in the upper surface and lower surface shown in FIG. 8 may be handled as a dead end at the upper surface and lower surface, thereby increasing difference between the derived flow rate vector and the actual fluid flow. This can be suppressed by considering data plane-symmetric (longitudinally symmetric in FIG. 8) with the porous body data 80 with respect to a contact surface, and thus a flow rate vector closer to the actual fluid flow rate can be derived.

Figure 9:
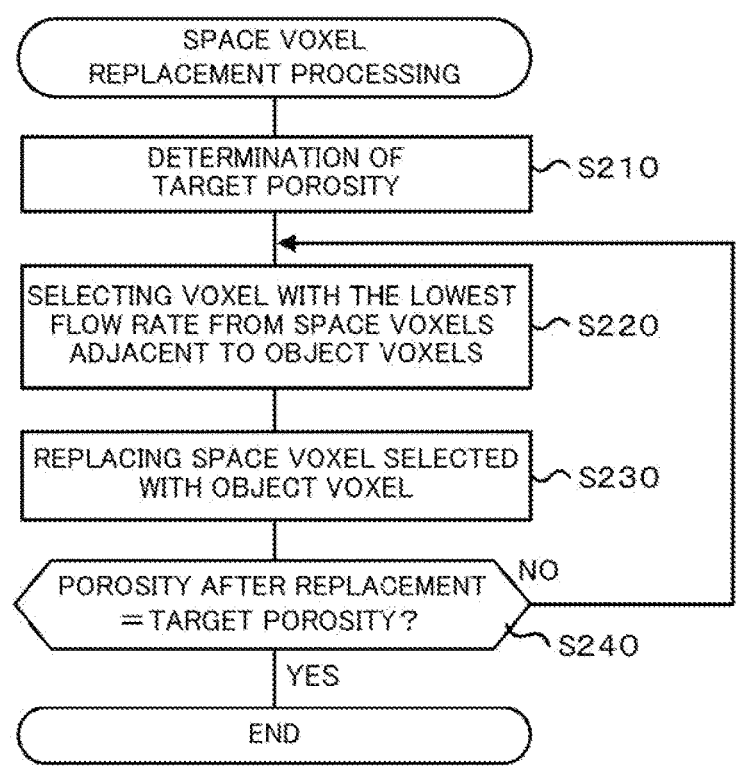
FIG. 9 is a flow chart showing an example of space voxel replacement processing.

Next, the CPU 22 performs Steps S120 to S130 as the step (c). First, the CPU 22 executes space voxel replacement processing in which voxels with a low flow rate among the space voxels in the porous body data 80 are preferentially replaced with object voxels based on the flow rate vectors derived in Step S110 (Step S120). FIG. 9 is a flow chart showing an example of the space voxel replacement processing.

When the space voxel replacement processing is executed, first the CPU 22 determines a target porosity (step S210). The target porosity is determined to be porosity as sufficiently low as that of the porous partition wall 44 of the honeycomb filter 30, for example, a value within the range of 25% to 50%. The target porosity may be determined by reading a value previously stored in the HDD 25 or may be determined to a value acquired from the user through the input device 27. The target porosity may be determined within the range of 40% or less.

Then, the CPU 22 selects one voxel with the lowest flow rate from the space voxels adjacent to the object voxels (Step S220). This processing can be performed based on the porous body table 81. For example, among the space voxels, only the space voxels adjacent to the object voxels are examined and determined as selection objects based on the XYZ coordinates and the type information in the porous body table 81. Then, one space voxel having the associated lowest flow rate is selected from the space voxels determined as the selection objects. In the embodiment, the "space voxel having the associated lowest flow rate" is a voxel having the minimum absolute value of the flow rate vector associated with the space voxel. The "space voxel having the associated lowest flow rate" may be a voxel having the minimum magnitude of a component in the exhaust gas passage direction (X direction) of the flow rate vectors associated with the space voxels.

Next, the CPU 22 replaces the space voxel selected in Step S220 with the object voxel (Step S230). Specifically, in the porous body table 81, the type information corresponding to the space voxel selected in Step S220 is changed from a value of 0 (space voxel) to a value of 9 (object voxel). Then, it is determined whether or not the porosity of the porous body data 80 after replacement coincides with the target porosity (Step S240). In this step, the porosity of the porous body data 80 is derived as a "number of space voxels/{number of voxels of the porous body data 80 (=number of space voxels+number of object voxels)}". When the porosity of the porous body data 80 after replacement does not coincide with the target porosity, the CPU 22 executes Step S220 and subsequent steps. That is, the space voxel adjacent to the object voxel and having the lowest flow rate is sequentially replaced with the object voxel until the porosity of the porous body data 80 after replacement coincides with the target porosity. In the second or subsequent Step S220, the voxel which has been replaced with the object voxel is determined as the object voxel. That is, in the second or subsequent Step S220, the voxel (initially the space voxel) which has been replaced with the object voxel also becomes the selection object. When in Step S240, the porosity of the porous body data 80 after replacement coincides with the target porosity, the space voxel replacement processing is finished. Since the porous body data 80 before the space voxel replacement processing in Step S120 is data of the temporary porous body, the porosity is higher than the target porosity. Therefore, each time when the space voxel is replaced with the object voxel in Step S230, the porosity of the porous body data 80 is decreased. In Step S240, not only when the porosity of the porous body data 80 after replacement coincides with the target porosity but also when the porosity of the porous body data 80 falls in a predetermined allowable range around the target porosity, it may be determined that the porosity of the porous body data 80 after replacement coincides with the target porosity. The allowable range is, for example, ±0.1% or the like, and may be appropriately determined according to the resolution of the porous body data 80 and the total number of voxels. In addition, when the porosity of the porous body data 80 first coincides with the target porosity or less, it may be determined that the porosity of the porous body data 80 after replacement coincides with the target porosity.

FIG. 10A, FIG. 10B and FIG. 10C are explanatory views showing a state of the space voxel replacement processing. For convenience of description, FIG. 10A, FIG. 10B and FIG. 10C shows cross-sections on the XY plane of the porous body data 80. FIG. 10A shows a state of the porous body data 80 before the space voxel replacement processing. When the space voxel replacement processing is performed for the porous body data 80, the space voxel with the lowest flow rate among the space voxels adjacent to the object voxels is sequentially replaced with the object voxel until the porosity of the porous body data 80 coincides with the target porosity. FIG. 10B is an explanatory view illustrating the object voxels replacing the space voxels by the space voxel replacement processing. Since, in the space voxel replacement processing, the space voxel having the lowest flow rate is sequentially replaced with the object voxel, as shown in FIG. 10B, the space voxel representing a pore (closed pore) in which the fluid does not flow because it is surrounded by the object voxel and the space voxel representing a dead-end pore in which the inflow surface 61 does not communicate with the outflow surface 62 are preferentially replaced with the object voxels. In addition, even when the space voxel represents a portion of a pore in which the inflow surface 61 communicates with the outflow surface 62, the space voxel with a low flow rate which is near the surface of the object voxel is replaced with the object voxel. As shown in FIG. 10C, when the space voxel replacement processing is finished, the number of the space voxels is decreased from before the space voxel replacement processing, thereby producing the porous body data 80 with the target porosity. In the space voxel replacement processing, when the porosity of the porous body data 80 is decreased to the target porosity, the space voxel with a low flow rate, that is, the space voxel representing an ineffective pore which does not relatively contribute to permeation of the fluid, is preferentially replaced with the object voxel.

Figure 11:
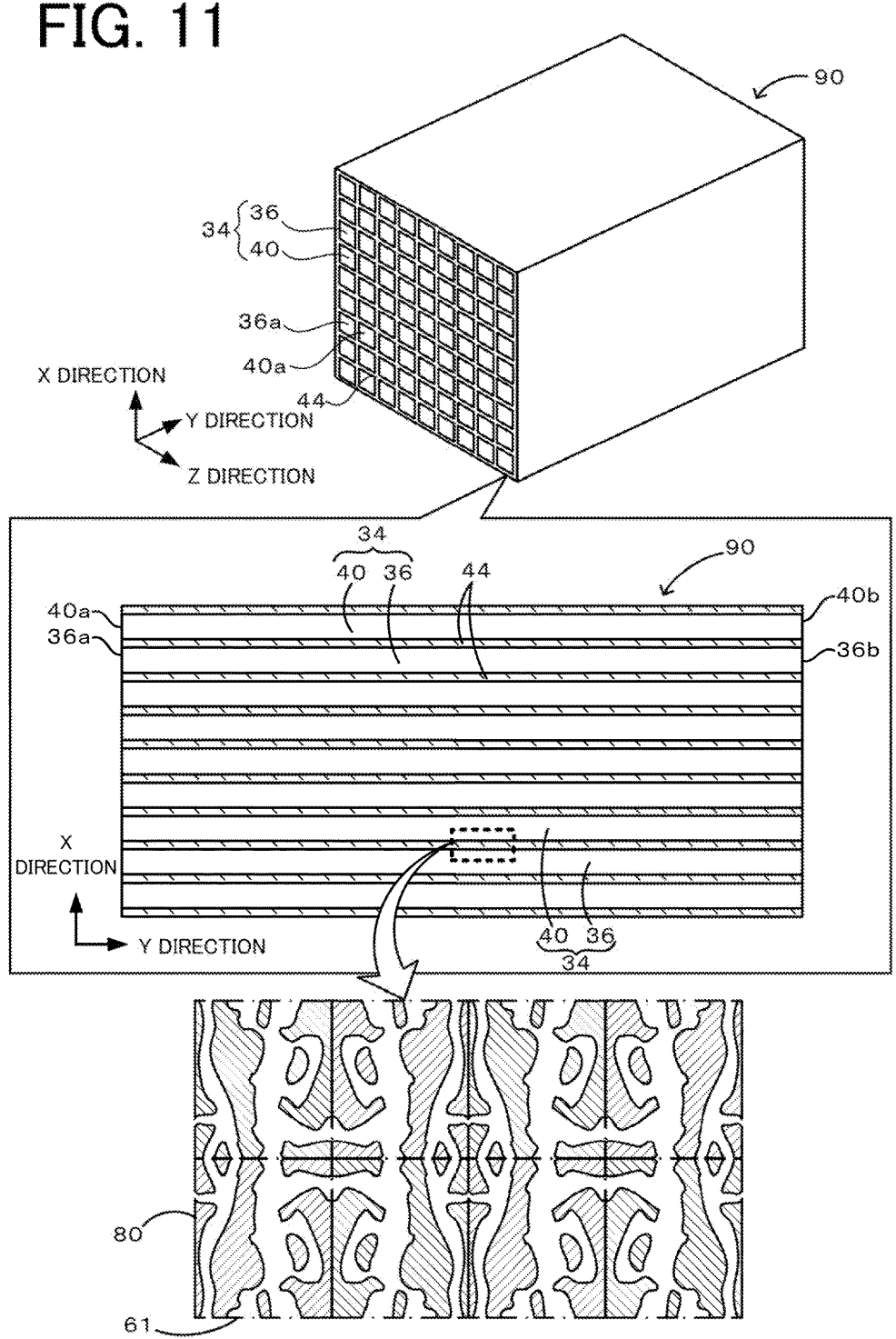
FIG. 11 is a conceptual view of porous partition wall data 90.

When the space voxel replacement processing in Step S120 is finished as described above, the CPU 22 performs porous partition wall data forming processing in which porous partition wall data 90 is formed based on the porous body data 80 after replacement and stored in the HDD 25 (Step S130) and finishes the routine. The porous partition wall data 90 is data representing the porous partition wall 44 which forms a plurality of cells serving as fluid flow passages and associates position information (XYZ coordinates) with type information. FIG. 11 is a conceptual view of the porous partition wall data 90. The porous partition wall data 90 is original data for the porous partition wall 44 of the honeycomb filter 30 formed in the step (d). The porous partition wall data 90 has the same configuration as the honeycomb filter 30 shown in FIG. 2 except that a cross-section (both end surfaces in the Y direction) has a tetragon, and that the outlet sealing material 38, the inlet sealing material 42, and the periphery protecting portion 32 are not formed. In the porous partition wall data forming processing, the CPU 22 forms data of the shape of the porous partition wall 44 by copying and connecting the porous body data 80 obtained by the space voxel replacement processing in Step S120. Then, the position information (XYZ coordinate system) of each voxel over the entire of the formed shape of the porous partition wall 44 is associated with the type information to form data as the porous partition wall data 90. In copying and connecting the porous body data 80, as shown in a lower portion of FIG. 11, porous body data having space voxels and object voxels which are plane-symmetrical with the porous body data 80 with respect to a contact surface is connected. As a result, the fluid passage (space voxel) is connected between the adjacent porous body data. Therefore, the flow passage can be easily formed from the inlet-open cell 36 to the outlet-open cell 40 in the porous partition wall data 30 formed by copying the porous body data 80. Therefore, an increase in permeation resistance of the porous partition wall 44 as compared with the permeation resistance of the single porous body data 80 can be more suppressed. Also, as shown in a lower portion of FIG. 11, in the porous partition wall data 90, if possible, the inflow surface 61 in the porous body data 80 is preferably disposed to face the inlet-open cell 36 side (lower side of the lower portion in FIG. 11). In particular, in the porous body data 80 disposed at a position (position in the inner periphery of the inlet-open cell 36) facing the inlet-open cell 36, the inflow surface 61 preferably faces the inlet-open cell 36 side. Also, the porous body data 80 is preferably arranged so that at least one of the inflow surface 61 or the outflow surface 62 of the porous body data 80 faces the inlet-open cell 36 side (the lower side in a lower drawing of FIG. 11). That is, the porous body data 80 is preferably arranged so that the direction (lateral direction of FIG. 8) between the inflow surface 61 and the outflow surface 62 of the porous body data 80 is a direction along the flew direction of a fluid in the porous body.

After the step (c) is performed, in the step (d), the porous body is formed based on the porous body data 80 after replacement. The step (d) includes a step (d1) of forming, by a three-dimensional shaping method, a reverse porous partition wall 100 in which the space voxel represents an object and the object voxel represents a space based on the porous partition wall data 90, a step (d2) of filling the spaces of the reverse porous partition wall 100 with a raw material slurry of the porous body (porous partition wall 44) to form a green porous partition wall 200, a step (d3) of burning out the reverse porous partition wall 100 by firing the green porous partition wall 200 to form the porous partition wall 44 in which cells 34 each having both open ends are formed, and a step (d4) of forming a sealed, portion (outlet sealing material 38 or inlet sealing material 42) in each of the plurality of ells 34 of the porous partition wall 44 so that an inlet-open cell 36 in which one of the ends is open and the other is sealed and an outlet-open cell 40 in which the open and sealed ends are reversed are alternately arranged.

Figure 12:
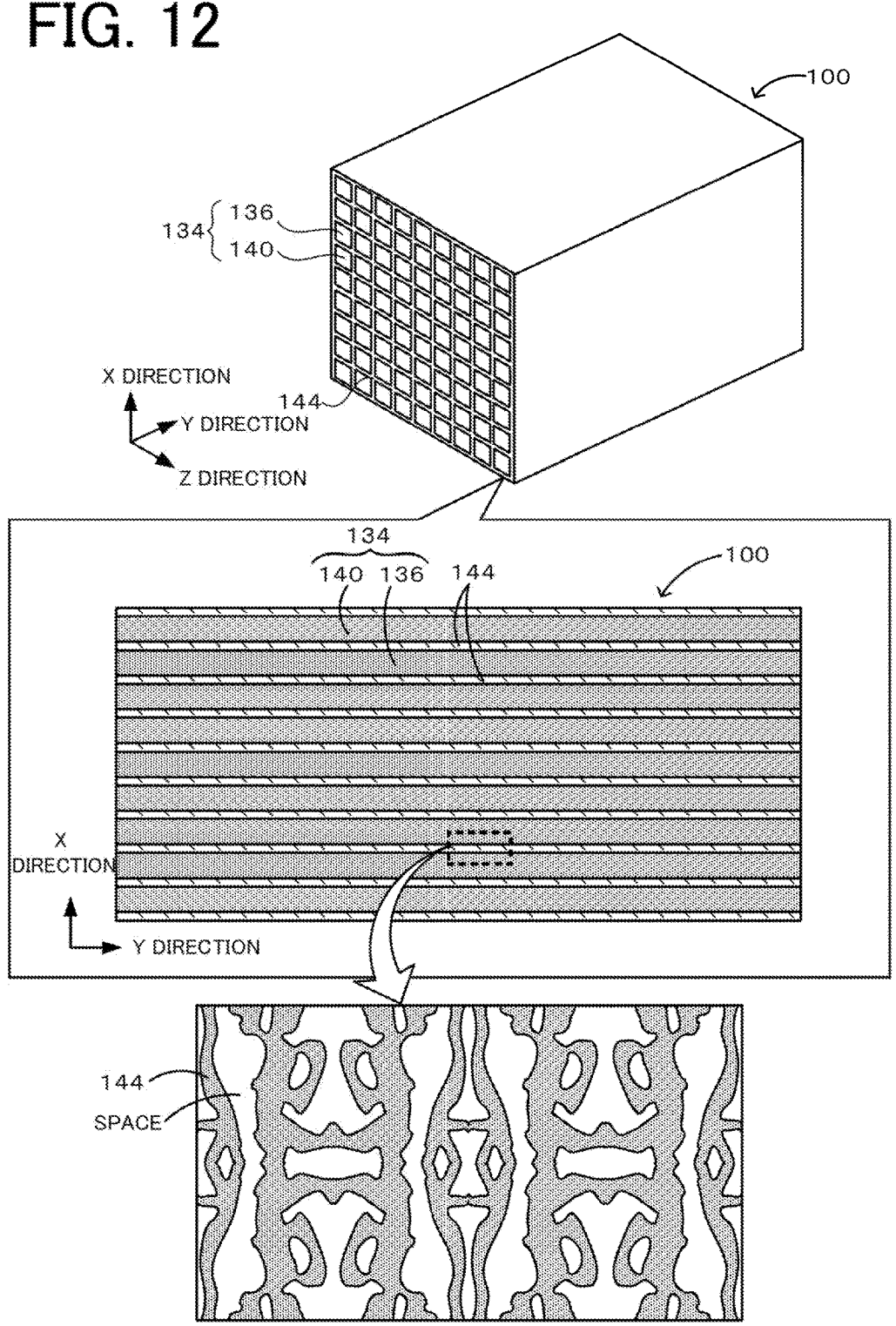
FIG. 12 is an explanatory view of a reverse porous partition wall 100.

The step (d1) is described. In the step (d1), the reverse porous partition wall 100 based on the porous partition wall data 90 is formed by a three-dimensional shaping method using a reverse porous forming material which is burned off after firing. FIG. 12 is an explanatory view of the reverse porous partition wall 100. The reverse porous partition wall 100 is formed by reversing space voxels to object voxels in the porous partition wall data 90 to form object voxel (space voxel in the porous partition wall data 90) portions composed of the reverse porous forming material after reversal. As shown, in the drawing, the reverse porous partition wall 100 includes a partition wall portion 144 in which a portion corresponding to a pore (space) in the porous partition wall 44 is composed of the reverse porous forming material and a portion corresponding to an object is formed as a pore (space), and a cell portion 134 (inlet cell portion 136 and outlet cell portion 140) in which a portion corresponding to the cell 34 is composed of the reverse porous forming material. In the embodiment, the reverse porous partition wall 100 is formed by using as the three-dimensional shaping method, an additive manufacturing method in which a shaping material is successively laminated while being cured to form a three-dimensional object. More specifically, the reverse porous partition mil 100 based on the porous partition wall data 90 is formed by using a known 3D (three-dimensional) printer in which the porous partition wall data 90 (particularly, the position information of space voxels) is input. In the 3D printer, besides the shaping material (modeling material), another known support material may foe used. The support material is used for supporting the shaping material by forming a space (=object voxel of the porous partition wall data 90) portion of the reverse porous partition wall 100. When the support material is used, the reverse porous partition wall 100 can be produced by removing the support material from the shaped product formed by the 3D printer. The support material may be removed by, for example, dissolving in water or heating. The reverse porous forming material may be any material which is burned off after firing, and examples thereof include acrylate-based or epoxy-based ultraviolet curable resins and the like. The 3D printer preferably has a resolution of 20 μm or less. When the resolution of the porous partition wall data 90 is different from that of the 3D printer, the data may be converted to data matching the resolution of the 3D printer by appropriately bonding voxels or reducing the number of voxels of the porous partition wall data 90. For example, the porous partition wall data 90 converted to data matching the resolution of the 3D printer may be formed when the porous partition wall data 90 is formed by the user PC 20. Alternatively, on the 3D printer side, the input porous partition wall data 90 may be converted to match the resolution of the 3D printer. Also, the input porous partition wall data 90 may be appropriately converted to match the format of data used in the 3D printer. The format of data used in the 3D printer is, for example, a STL (standard Triangulated Language format, also referred, to as "Stereolithography"). The data may be converted by using the user PC 20 or the 3D printer.

Figure 13:
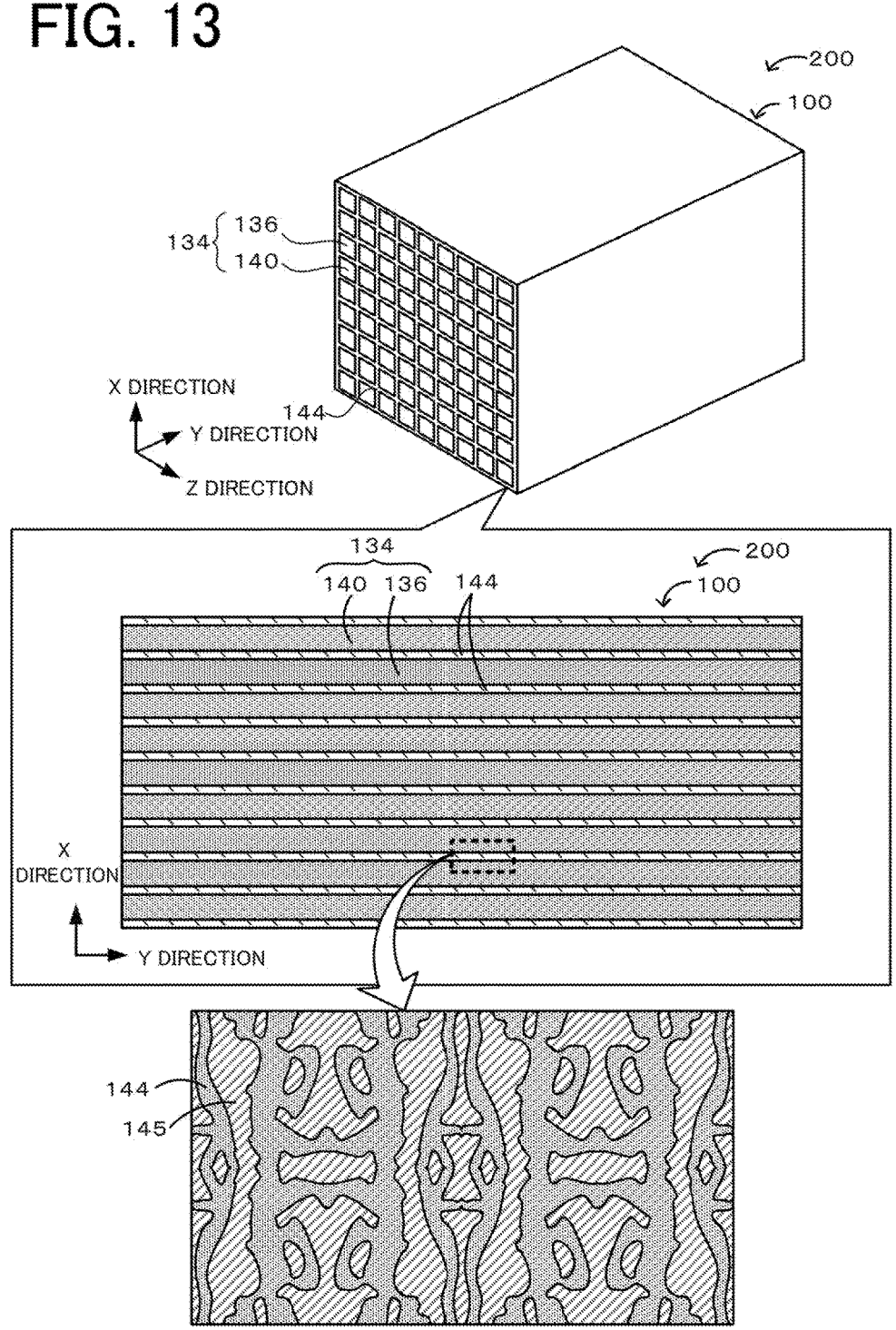
FIG. 13 is an explanatory view of a green porous partition wall 200.

Next, in the step (d2), the spaces of the reverse porous partition wall 100 are filled with the raw material slurry of the porous partition wall 44 to form the green porous partition wall 200. FIG. 13 is an explanatory view of the green porous partition wall 200. In the embodiment, spaces of the partition wall portion 144 which are space portions of the reverse porous partition wall 100 are filled with a raw material slurry 145 by injecting the raw material slurry 145 from both sides of the reverse porous partition wall 100 in the Y direction. The green porous partition wall 200 may be formed by immersing the entire of the reverse porous partition wall 100 in the raw material slurry 145. The raw material slurry can be prepared by, for example, mixing a base material with a dispersant. The above-described ceramic material can be used as the base material. For example, when SiC is used as the base material, a material prepared by mixing a SiC powder and a metal Si powder at a mass ratio of 80:20 can be used. A surfactant such as ethylene glycol can be used as the dispersant. A method for preparing the slurry is not particularly limited and, for example, a method using a kneader, a vacuum auger machine, or the like can be used.

Figure 14:
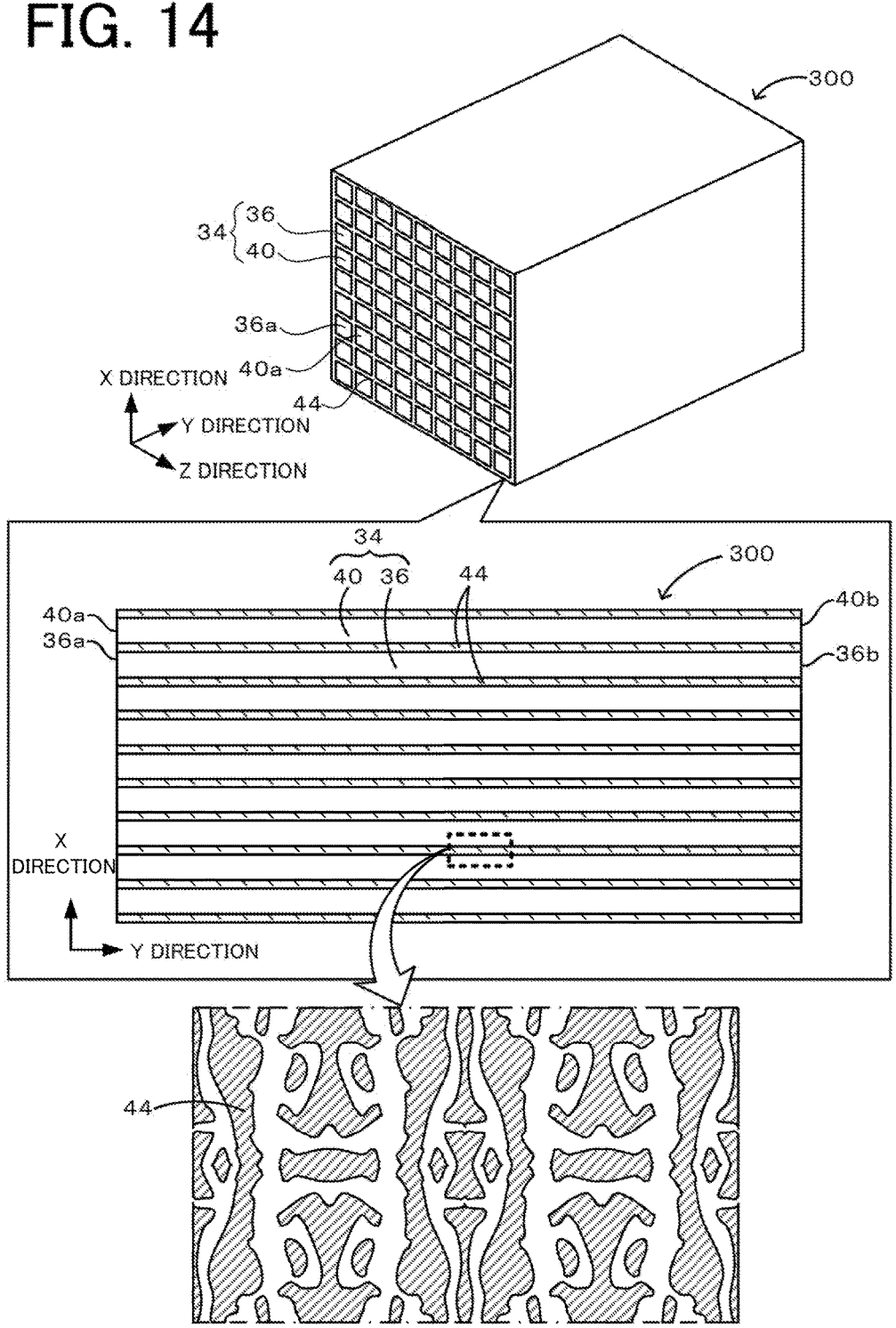
FIG. 14 is an explanatory view of a honeycomb structure 300.

Then, in the step (d3), the green porous partition wall 200 is fired. Before firing, drying or calcination treatment may be performed. The calcination treatment is a treatment of removing organic components contained in the honeycomb filter 30 by burning at a temperature lower than a firing temperature. The firing temperature may be 1400° C. to 1450° C. for a cordierite raw material and 1450° C. for Si-bond SiC. The firing causes sintering of the raw material slurry 145 of the green porous partition wall 200 to form the porous partition wall 44. On the other hand, the reverse porous partition wall 100 (the partition wall portion 144 and the cell portion 134) is burned off by firing. Therefore, the reverse porous partition wall 100 becomes a space, thereby forming the honeycomb structure 300 including the porous partition wall 44 and a plurality of cells 34 having both open ends and being formed by the porous partition wall 44. FIG. 14 is an explanatory view of the honeycomb structure 300. The porous partition wall 44 has a shape based on object voxels of the porous body data 80 for the porous partition wall data 90 shorn in FIG. 11.

In the step (d4), a sealed portion (the outlet sealing material 38 or the inlet sealing material 42) is formed in each of the cells 34 so that the inlet-open cell 36 in which one of the ends is open and the other is sealed arid the outlet-open cell 40 in which the one of the ends is sealed and the other is opened are alternately arranged. The outlet sealing material 38 and the inlet sealing material 42 may be formed by using the same material as a raw material used for forming the porous partition wall 44. In this case, the outlet sealing material 38 and the inlet sealing material 42 are formed by sealing, with the raw material slurry, a portion in which a sealed portion is to be formed at one of the openings of each of the cells 34 in the honeycomb structure 300 and then performing the same firing as in the step (d3). In the embodiment, after the outlet sealing material 38 and the inlet sealing material 42 are formed, the periphery of the honeycomb structure 300 is cut, and then the cut periphery is coated with a protecting material to form the protecting portion 32, thereby producing the honeycomb filter 30 having a cylindrical outer shape shown in FIG. 1.

According to the embodiment described in detail above, the porous body constituting the porous partition wall 44 of the honeycomb filter 30 has a porosity of 25% to 50% and a permeation resistance of 100 Pa/mm or less, and thus both the porosity and the permeation resistance are sufficiently decreased.

In producing the porous partition wall 44, the porous body data 60 representing the temporary porous body having porosity higher that the target porosity is acquired, and information about the flow-rate of each space voxel is derived by fluid analysis based on the porous body data 60 (porous body data 80). Then, in the porous body data 80, space voxels with a low flow rate among the space voxels in the porous body data 80 are preferentially replaced with object voxels based on the derived information about the flow rate, and the porosity of the porous body data 80 is caused to coincide with the target porosity. As a result, space voxels with a low flow rate, that is, space voxels representing pores which do not relatively contribute to permeation of a fluid, can be preferentially replaced with object voxels. Therefore, even when the porosity of the porous body data 80 is decreased (brought near to the target porosity) by replacing space voxels with object voxels, the permeation resistance of the porous body represented by the porous body data 80 after replacement is little increased. Therefore, an increase in permeation resistance of the porous body represented by the porous body data 80 after replacement is further suppressed while the porosity of the temporary porous body as the origin is decreased to the target porosity, and thus both the porosity and the permeation resistance are sufficiently decreased. In addition, when the porous partition wall 44 based on the porous body data 80 after replacement is formed, the porous partition wall 44 with porosity and permeation resistance both of which are satisfactory low can be produced.

Also, the target porosity is 25% to 50%, and thus the porosity of the produced porous partition wall 44 can be easily adjusted to, for example, 25% to 50%, and the porosity of the produced porous partition wall 44 can foe sufficiently decreased.

Further, in the step (c), among the space voxels adjacent to object voxels, space voxels with a low flow rate are preferentially replaced with object voxels. In this case, when space voxels not adjacent to any object voxel are replaced with object voxels, the object voxels after replacement may be brought into a state of floating in the air in the porous body. The porous partition wall 44 having such a shape cannot be easily actually formed. This can be avoided by replacing the space voxels adjacent to the object voxels, and the porous partition wall 44 based on the porous body data 80 after replacement in the step (c) can be easily formed.

Further, in the step (c), the space voxel with the lowest flow rate is first replaced with the object voxel. In this case, the voxel representing a pore which least contributes to permeation of a fluid is fist replaced with the object voxel, and thus the permeation resistance of the porous body represented by the porous body data 80 after replacement is less increased. Therefore, the permeation resistance of the produced porous partition wall has lower permeation resistance.

Also, in the step (d), the reverse porous partition wall 100 is formed by the three-dimensional shaping method, spaces of the reverse porous partition wall 100 are filled with the raw material slurry of the porous partition wall 44 to form the -green porous partition wall 200, and then the reverse porous body 100 is burned off by firing the green porous body 200 to form the porous partition wall 44. Consequently, for example, even when the porous partition wall 44 cannot be directly formed based on the porous partition wall data 90 by the three-dimensional shaping method using a raw material of the porous partition wall 44, the porous partition wall 44 can be formed based on the porous partition wall data 90. In addition, not only the pores but also the cell portions 134 in the porous partition wall 44 are formed as the .reverse porous partition wall 100 which is then burned off, and thus the honeycomb filter 30 can be produced. Therefore, the honeycomb filter 30 including the porous partition wall 44 having porosity and permeation resistance which are both sufficiently decreased can be produced.

The present invention is not limited to the embodiment described above, and can be realized according to various embodiments within the technical scope of the present invention.

For example, in the embodiment described above, in the step (a) (Step S100), the porous boy data 60 is acquired by reading it stored in the HDD 25, but an acquiring method is not limited to this. Data stored in a device (for example, an external storage device connected to the user PC 20) other than the HDD 25 may be read out. Alternatively, porous body data may be acquired from an apparatus used for CT scanning, Although, in the embodiment described above, the porous body data 60 is data acquired by CT scanning of an existing honeycomb filter, an acquiring method is not limited to this. That is, the temporary porous body may be existing or non-existing. For example, in the step (a), porous body data may be acquired by randomly arranging object voxels and space voxels so that a predetermined porosity value is obtained.

Although, in the embodiment described above, in the step (c) (Step S120), whether or not the porosity becomes the target porosity is determined each time when one space voxel is replaced, but a plurality of space voxels may be replaced at one time. Also, the information about the flow rate may be renewed by fluid analysis processing in Step S110 each time when a predetermined number of space voxels is replaced.

Although, in the embodiment described above, in the step (c), the porous partition wall data 90 about the shape of the porous partition wall 44 is formed by copying and connecting the porous body data 80 after replacement, a forming method is not limited to this. For example, the porous body data 80 after replacement may be obtained for data of the entire of the honeycomb filter 30 (entire of the porous partition wall 44) by executing the porous body data processing routine shown in FIG. 4 for the entire of data about the porous partition wall 44 in the porous body data 60 used as the origin.

Although, in the embodiment described above, the reverse porous partition wall 100 is formed by the additive manufacturing method, the method is not limited to this, and another three-dimensional shaping method may be used. For example, a stereolithography method tray be used. Also, the porous partition wall 44 may be formed directly by the three-dimensional shaping method based on the porous partition wall data 90. For example, the porous partition wall 44 may be formed directly based on the porous partition wall data 90 by laser-sintering a SiC powder without forming the reverse porous partition wall 100. In addition, any other method may be used as long as a porous body is formed based on the porous partition wall data 90 (porous body data 80).

Although, in the embodiment described above, the reverse porous partition wall 100 is completely formed, and then the green porous partition wall 200 is formed by injecting the raw material slurry, but the method is not limited to this. For example, the reverse porous partition wall 100 is divided into a plurality of regions (for example, regions divided vertically to the Y direction in FIG. 12), and the reverse partition wall is formed in one of the regions, followed by injection of the raw material slurry. Then, the reverse partition wall is continuously formed in a next region, followed by injection of the raw material slurry. In this way, the green porous partition wall 200 may be formed by repeating the formation of the reverse partition wall and the injection of the raw material slurry.

Although, in the embodiment described above, in the step (c) (Step S120), the space voxel having the lowest flow rate is first replaced with the object voxel, the replacement is not limited to this. The space voxel having a low flow rate may be preferentially replaced with the object voxel. However, it is preferred to first replace the space voxel having the lowest flow rate with the object because an increase in permeation resistance after the replacement can be more suppressed.

In the embodiment described above, the porous body constituting the porous partition wall 44 of the honeycomb filter 30 has a porosity of 25% to 50%, but the porosity is not limited to this. The porosity may be 20% or more or 30% or more. Also, the porosity may be 60% or less.

In the embodiment described above, the porous body constituting the porous partition wall 44 of the honeycomb filter 30 has sufficiently low porosity and permeation resistance, but the porous body is not limited to this as long as it has sufficiently low porosity and sufficiently high permeation property. For example, the porous body may have sufficiently low porosity and sufficiently high permeability. Specifically, the porous body may have a porosity of 20% to 60% and a permeability of 1 $\mu m^2$ or more. Further, the porous body may satisfy k≥0.2823 P−10.404 wherein P is porosity and k is permeability. In addition, when the permeability k may be sufficiently high, the permeation resistance need not necessarily be 100 Pa/mm or less. The permeability k is preferably 2 $\mu m^2$ or more. Also, the permeability k may be 10 $\mu m^2$ or less or 9 $\mu m^2$ or less. Also, the porous body may satisfy k≤0.1627 P−0.4955. Further, the porous body may satisfy k≥0.1627 P−3.0. Like the porous body according to the embodiment described above, the porous body satisfying these numerical conditions can be produced by the production method described in the embodiment described above or the production method described in the modified example described above.

Although, in the embodiment described above, the porous body is produced by the method including the steps (a) to (d), the first porous body of the present invention and the second porous body of the present invention may be produced by another production method.

Although, in the embodiment described above, the porous partition wall 44 of the honeycomb filter is described as an example of the porous body, the porous body is not limited to this and may be any porous body. For example, the porous body may be a metal-made porous body such as a foamed metal or sintered metal filter. When a metal-made porous body is produced, the porous body may be formed directly by a three-dimensional shaping method based on the porous body data after replacement in the step (c).

EXAMPLES

Examples of production of a honeycomb filter are described as experimental examples below. Experimental Examples 1 to 3 correspond to examples of the present invention, and Experimental Examples 4 to 6 correspond to comparative examples. The present invention is not limited to these examples below.

[Formation of Porous Body Data Processor]

A processing program of the porous body data processing routine of the embodiment described above was formed. The program was stored in HDD of a computer including the HDD and a controller which includes CPU, ROM, and RAM, forming the user PC 20 shown in FIG. 3 serving as a porous body data processor.

Experimental Example 1

A honeycomb filter 30 of Experimental Example 1 was produced by using the user PC 20. First, a honeycomb filter having a porosity of 59.0% and a permeation resistance of 22.6 Pa/mm was prepared as a temporary porous body, and the porous body data 60 was formed by CT scanning. The temporary porous body was a honeycomb filter of Experimental Example 4 described below. The porosity of the temporary porous body was a value determined as the "number of space voxels of the porous body data 60/ (number of voxels of the porous body data 60)". In addition, the pressure loss of the temporary porous body was measured by the method described in examples of Japanese Unexamined Patent Application Publication No. 2005-114612, and permeation resistance was determined as "permeation resistance=(pressure loss/thickness of the porous partition all 44)".

Next, as the steps (a) to (c), the porous boy data processing routine was executed for the porous body data 60 by using the user PC 20, acquiring the porous partition wall data 90. The target porosity was 30%. The porous partition wall data 90 was acquired on the assumption that a cell shape was a tetragon, and an entire shape was the shape of a rectangular cylinder honeycomb structure. In the porous partition wall data 90, the thickness of the porous partition wall 44 was 300 μm, the cell density was 300 cells/cm$^2$, a sectional shape had a side of 143.8 mm, and a length was 152.4 mm.

Then, as the step (d), the honeycomb filter 30 was produced by the same method as in the embodiment described above based on the resultant porous partition wall data 90. In the step (d1), Agilista 3100 (resolution of 15 μm) manufactured by KEYENCE was used as a 3D printer. The raw material slurry in the step (d2) was prepared as described below. First, a SiC raw material was prepared by mixing a SiC powder and a metal Si powder at a weight ratio of 80:20. The raw material slurry was prepared by adding, to 100 part by weight of the SiC mixed raw material, 35 parts by weight of a dispersion medium, 6 parts by weight of an organic binder, and 0.5 parts by weight of a dispersant. In this case, water was used as the dispersion medium, cellulose and hydroxypropylmethyl cellulose was used as the organic binder, and ethylene glycol was used as the dispersant. In the step (d2), the green porous partition wall 200 was produced by injecting the raw material slurry at 10 L/min from both sides of the reverse porous partition wall 100 in the Y direction. In the step (d3), the green porous partition wall 200 was dried by a microwave dryer and then completely dried by a hot-air dryer, and then fixed in an Ar inert atmosphere at 1450° C. for 2 hours. In this step, the reverse porous partition wall 100 composed of the reverse porous forming material was burned out to produce the honeycomb structure 300. In the step (d4), cell openings at one of the end surfaces of the honeycomb structure 300 were alternately masked, and the masked end surface was immersed in a sealing slurry composed of the same raw material slurry as the porous partition wall 44, thereby forming sealed portions so that an open portion and a sealed portion were alternately arranged. Similarly, the other end surface of the honeycomb structure 300 was masked, and sealed portions were formed so that, a cell in which one of the ends was open and the other end was sealed and a cell in which one of the ends was sealed and the other end was opened were alternately arranged. Then, a segment formed body in which the sealed portions were formed was dried by hot-air dryer and fired in an Ar inert atmosphere at 1450° C. for 2 hours, producing the sealed portions. Then, the periphery of the honeycomb structure 300 was cut, coated with a peripheral coating slurry prepared by kneading alumina silicate fibers, colloidal silica, polyvinyl alcohol, SiC, and water, and then cured by drying to form the periphery protecting portion 32 on the cut periphery. As a result, the honeycomb filter 30 having a cylindrical outer shape shown in FIGS. 1 and 2 was produced. The cross section of the honeycomb filter 30 had a diameter of 143.8 mm.

Experimental Examples 2 and 3

A honeycomb filter 30 of Experimental Example 2 was produced by the same method as in Experimental Example 1 described above except that the target porosity was 40%. Also, a honeycomb filter 30 of Experimental Example 3 was produced by the same method as in Experimental Example 1 described above except that the target porosity was 50%.

Experimental Example 4

A honeycomb filter 30 was produced by a usual production method without using the user PC 20. First, a raw material slurry was prepared by adding, to 100 part by weight of the SiC mixed raw material, 35 parts by weight of a dispersion medium, 6 parts by weight of an organic binder, and 0.5 parts by weight of a dispersant. In this case, water was used as the dispersion medium, coke having an average particle diameter of 10 μm was used as a pore forming material, hydroxypropylmethyl cellulose was used as the organic binder, and ethylene glycol was used as the dispersant. Next, the raw material slurry was extrusion-molded by using a predetermined mold to produce a honeycomb compact having the same shape as the honeycomb structure 300 of Experimental Example 1. The resultant, honeycomb compact was dried by a microwave dryer and further completely dried by a hot-air dryer. Next, the honeycomb compact was immersed in a sealing slurry by the same method as in the step (d4) of Experimental Example 1 form a sealed portion. Then, the honeycomb compact and the sealed portions were sintered by firing in an Ar inert atmosphere at 1450° C. for 2 hours, producing a honeycomb structure having the same shape as Experimental Example 1. Then, like in Experimental Example 1, the periphery of the honeycomb structure was cut, coated with a protecting material to form a periphery protecting portion 32 on the cut periphery, thereby producing a honeycomb filter having a cylindrical outer shape.

Experimental Examples 5 and 6

Honeycomb filters of Experimental Examples 5 and 6 were produced by the same method as in Experimental Example 4 except that the particle diameters of the SiC powder and the pore forming material in the raw material slurry of the porous partition wall 44 were properly changed.

[Evaluation of Porosity]

The porosity of each of the honeycomb filters of Experimental Examples 1 to 6 was measured. In measuring the porosity, the porous body data 60 for each honeycomb filter was formed by CT scanning, and the porosity was determined as the "number of space voxels/(number of voxels of the porous body data 60)". The porosity in Experimental Example 1 was 29.7% (29.72653%), the porosity in Experimental Example 2 was 39.6% (39.58585%), the porosity in Experimental Example 3 was 49.9% (43.88232%), the porosity in Experimental Example 4 was 59.0% (59.02%), the porosity in Experimental Example 5 was 46.0% (45.98%), and the porosity in Experimental Example 6 was 40.1% (40.14%).

[Evaluation of Permeation Resistance]

The pressure loss of each of the honeycomb filters of Experimental Examples 1 to 6 was measured by the method described in examples in Japanese Unexamined Patent Application Publication No. 2005-114612, and permeation resistance=(pressure loss/thickness of the porous partition wall 44) was determined. The permeation resistance in Experimental Example 1 was 80.4 Pa/mm, the permeation resistance in Experimental Example 2 was 48.1 Pa/mm, the permeation resistance in Experimental Example 3 was 33.1 Pa/mm, the permeation resistance in Experimental Example 4 was 22.6 Pa/mm, the permeation resistance in Experimental Example 5 was 124.6 Pa/mm, and the permeation resistance in Experimental Example 6 was 160.3 Pa/mm.

[Evaluation of Collection Performance]

The number of particles leaking from each of the honeycomb filters of Experimental Examples 1 to 6 was measured as a value indicating actual collection performance. Specifically, each of the honeycomb filters of Experimental Examples 1 to 6 was attached to a car body, engine exhaust gas was passed through the honeycomb filter during predetermined mode driving (NEDC: New European Driving Cycle). Then, an amount (number of particles/s) of leakage of particulate matter (PM/soot) in the engine exhaust gas was measured after passage through the honeycomb filter. A smaller amount of leakage represents higher collection performance.

Figure 15:
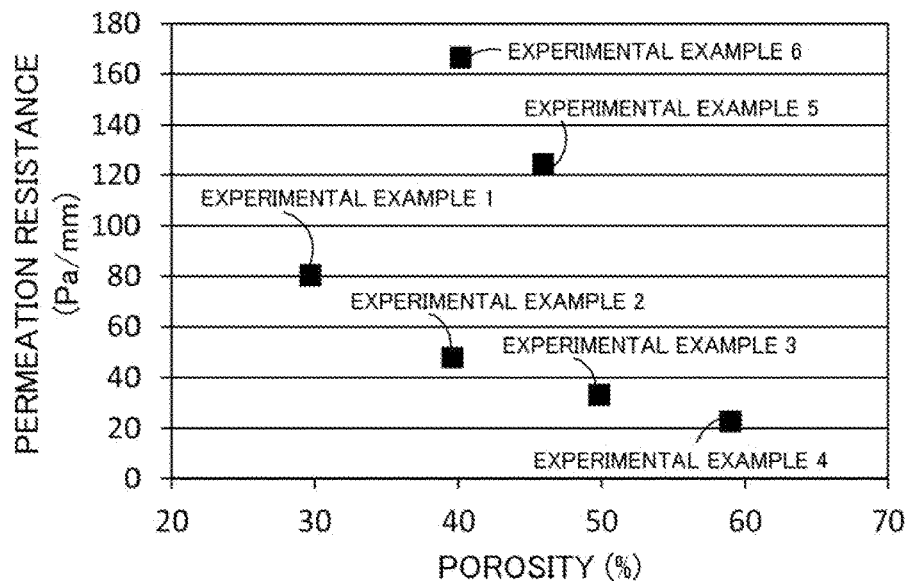
FIG. 15 is a graph formed by plotting the porosity and permeation resistance of honeycomb filters of Experimental Examples 1 to 6.
Figure 16:
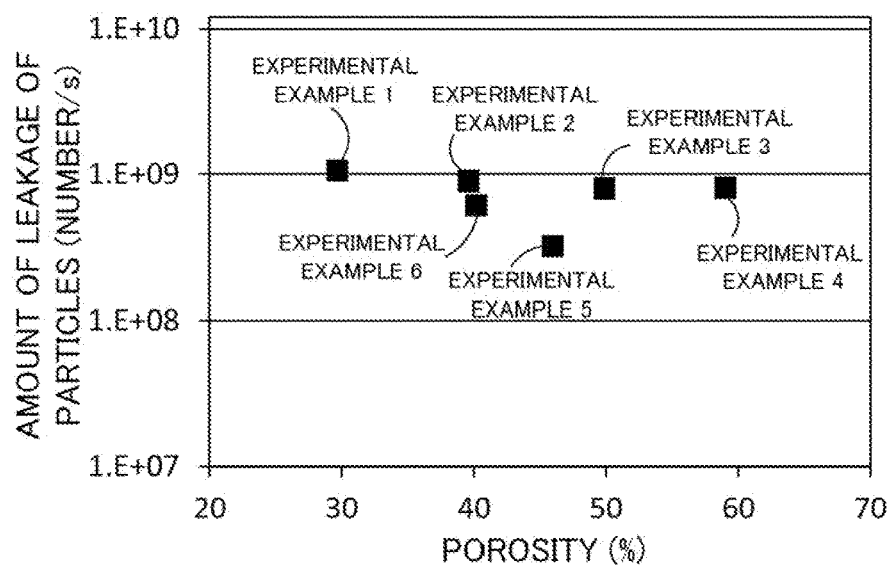
FIG. 16 is a graph formed by plotting the porosity and amount of leakage of particles of honeycomb filters of Experimental Examples 1 to 6.

FIG. 15 is a graph formed by plotting the porosity and permeation resistance of the honeycomb filters of Experimental Examples 1 to 6. FIG. 16 is a graph formed by plotting the porosity and amount of leakage of particles of the honeycomb filters of Experimental Examples 1 to 6. FIG. 15 indicates that in comparison between Experimental Examples 2 and 6 having substantially the same porosity (about 40%), the permeation resistance of Experimental Example 2 formed by the production method of the present invention is decreased to ⅓ or less. Also, Experimental Example 1 also has low permeation resistance in spite of having lower porosity than. Experimental Examples 5 and 6. It was confirmed from these results that the production method of the present invention can produce a honeycomb filter having a porosity of 25% to 50% and a permeation resistance of 100 Pa/mm or less and thus having both the porosity and permeation resistance which are sufficiently low. FIG. 16 indicates that Experimental Examples 1 to 3 have substantially the same amount of leakage of particles and substantially the same collection performance as Experimental Examples 4 to 6.

[Evaluation of Permeability]

The permeability k [μm²] of the porous body (porous partition wall 44) of each of the honeycomb filters of Experimental Examples 1 to 6 was measured. The permeability was measured as follows. First, like in the measurement of permeation resistance described above, pressure loss ΔP of the porous partition wall 44 was measured by the method described in an example of Japanese Unexamined Patent Application Publication No. 2005-114612. A gas flowed for measuring the pressure loss ΔP was dry air having a humidity of 30% and a viscosity coefficient μ of 1.85×10⁻⁵ Pa·s. The thickness L of the porous partition wall 44 used in measurement was 288.0 μm in Experimental Examples 1 to 4, 308.4 μm in Experimental Example 5, and 244.0 μm in Experimental Example 6. Then, the permeability k of the porous body was calculated by using the measured pressure loss ΔP according to equation (1) below based-en the Darcy equation. In addition, the flow rate q [m/s] of the gas was measured by using ultrasonic gas flowmeter SGF-100 (manufactured by Sonic Corporation). The permeability of Experimental Example 1 was 2.29774 μm², the permeability of Experimental Example 2 was 3.844979 μm², the permeability of Experimental Example 3 was 5.576586 μm², the permeability of Experimental Example 4 was 6.255658 μm², the permeability of Experimental Example 5 was 1.48342 μm², and the permeability of Experimental Example 6 was 0.926316 μm².

$$k = q \times 10^5 \times \mu \times L / \Delta P \qquad \text{Formula (1)}$$

(wherein k: permeability [μm²], q: flow rate [m/s], μ: viscosity coefficient [Pa·s], L: thickness of porous body [μm], and ΔP: pressure loss [Pa]).

[Relation between Porosity P and Permeability k]

Figure 17:
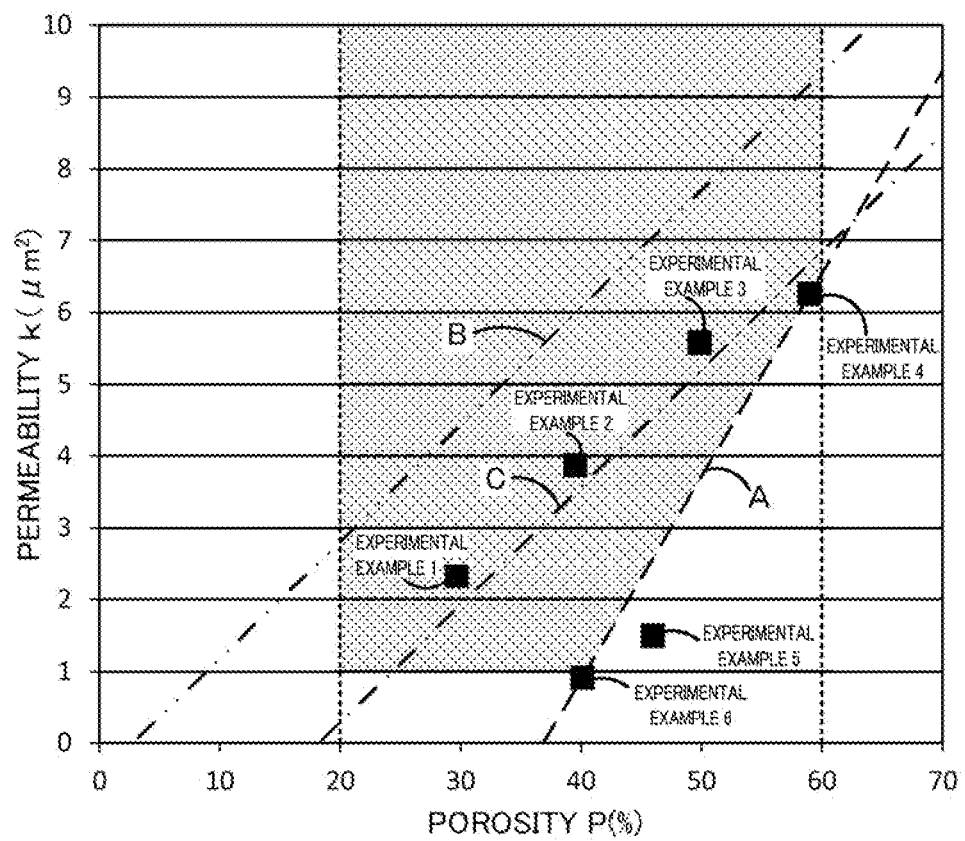
FIG. 17 is a graph formed by plotting porosity P and permeability k of the porous partition walls 44 of the honeycomb filters of Experimental Examples 1 to 6.

FIG. 17 is a graph formed by plotting porosity P and permeability k measured as described above for the porous partition walls 44 of the honeycomb filters of Experimental Examples 1 to 6. FIG. 17 also shows straight line A (k=0.2823 P−10.404), straight line B (k=0.1627 P−0.4955), and straight line C (k=0.1627 P−3.0). Further, FIG. 17 shows a hatched region having a porosity P of 20% to 60% and a
permeability k of 1 μm² or more and satisfying k≥0.2823 P−10.404 (present in a region of permeability k above the straight line A in FIG. 17).

FIG. 17 indicates that Experimental Examples 1 to 3 tend to have lower porosity P and higher permeability k as a whole (near the upper left in the graph of FIG. 17) as compared with Experimental Examples 4 to 6. In comparison between Experimental Examples 2 and 6 having the same degree of porosity P (about 40%), the permeability k of Experimental Example 2 produced by the production method of the present invention is about 4 times as high as that of Experimental Example 6. Also, in comparison with Experimental Examples 5 and 6, Experimental Example 1 has lower porosity P but has higher permeability k. it could be confirmed by these results that the production method of the present invention can produce a porous body having a porosity P of 20% to 60% and a permeability k of 1 μm² or more and satisfying k≥0.2823 P−10.404 (=present in a region of permeability k above the straight line A in FIG. 17), and having sufficiently low porosity ad sufficiently high permeation property.

In addition, the straight line A was determined as a straight line passing slightly above (higher permeability k) Experimental Examples 4 and 6 in FIG. 17. The straight line B was determined as a straight line passing above Experimental Examples 1 to 3. The straight line C was determined as a straight line passing slightly below Experimental Examples 1 to 3.

It could be confirmed by Experimental Examples 1 to 3 shown in FIG. 17 that a porous body having a permeability k of 2 μm² or more and a permeability k of 10 μm² or less or 9 μm² or less can be produced. Also, it could be confirmed by Experimental Examples 1 to 3 that a porous body satisfying k≤0.1627 P−0.4955 (=a region on the straight line B and below the straight line B in FIG. 17) can be produced. Further, it could be confirmed by Experimental Examples 1 to 3 that a porous body satisfying k≥0.1627 P−3.0 (=a region on the straight line C and above the straight line C in FIG. 17) can be produced.

What is claimed is:

1. A method for producing a porous body including the steps of;
   (a) a step of acquiring porous body data which is data representing a temporary porous body having porosity higher than target porosity, and which associates position information indicating a three-dimensional position of a voxel with voxel type information containing information capable of discriminating whether the voxel is a space voxel representing space or an object voxel representing an object;
   (b) a step of deriving information about a flow rate for each space voxel during passage of a fluid through inside of the porous body represented by the porous body data by performing fluid analysis based on the porous body data;

(c) a step of preferentially replacing a voxel having a low flow rate among the space voxels in the porous body data with an object voxel based on the information about a flow rate, and adjusting the porosity of the porous body data to the target porosity; and (d) a step of forming a porous body based on the porous body data after replacement.

2. The method for producing the porous body according to claim 1, wherein the target porosity is 20% to 60%.

3. The method for producing the porous body according to claim 2, wherein in the step (c), a voxel having a low flow rate among the space voxels adjacent to an object voxel is preferentially replaced with an object voxel.

4. The method for producing the porous body according to claim 3, wherein in the step (d), the porous body based on the porous body data after replacement is formed directly by a three-dimensional shaping method.

5. The method for producing the porous body according to claim 3, wherein the step (d) includes the steps of;
- (d1) a step of forming a reverse porous body in which a space voxel is taken as an object and an object voxel is taken as space by a three-dimensional shaping method based on the porous body data after replacement;
- (d2) a step of forming a green porous body by filling the spaces of the reverse porous body with a raw material slurry of the porous body; and
- (d3) a step of burning out the reverse porous body by firing the green porous body to form the porous body.

6. The method for producing the porous body according to claim 2, wherein in the step (d), the porous body based on the porous body data after replacement is formed directly by a three-dimensional shaping method.

7. The method for producing the porous body according to claim 2, wherein the step (d) includes the steps of;
- (d1) a step of forming a reverse porous body in which a space voxel is taken as an object and an object voxel is taken as space by a three-dimensional shaping method based on the porous body data after replacement;
- (d2) a step of forming a green porous body by filling the spaces of the reverse porous body with a raw material slurry of the porous body; and
- (d3) a step of burning out the reverse porous body by firing the green porous body to form the porous body.

8. The method for producing the porous body according to claim 1, wherein in the step (c), a voxel having a low flow rate among the space voxels adjacent to an object voxel is preferentially replaced with an object voxel.

9. The method for producing the porous body according to claim 8, wherein in the step (d), the porous body based on the porous body data after replacement is formed directly by a three-dimensional shaping method.

10. The method for producing the porous body according to claim 8, wherein the step (d) includes the steps of;
- (d1) a step of forming a reverse porous body in which a space voxel is taken as an object and an object voxel is taken as space by a three-dimensional shaping method based on the porous body data after replacement;
- (d2) a step of forming a green porous body by filling the spaces of the reverse porous body with a raw material slurry of the porous body; and
- (d3) a step of burning out the reverse porous body by firing the green porous body to form the porous body.

11. The method for producing the porous body according to claim 1, wherein in the step (c), a voxel having the lowest flow rate is first replaced with an object voxel.

12. The method for producing the porous body according to claim 11, wherein in the step (d), the porous body based on the porous body data after replacement is formed directly by a three-dimensional shaping method.

13. The method for producing the porous body according to claim 11, wherein the step (d) includes the steps of;
- (d1) a step of forming a reverse porous body in which a space voxel is taken as an object and an object voxel is taken as space by a three-dimensional shaping method based on the porous body data after replacement;
- (d2) a step of forming a green porous body by filling the spaces of the reverse porous body with a raw material slurry of the porous body; and
- (d3) a step of burning out the reverse porous body by firing the green porous body to form the porous body.

14. The method for producing the porous body according to claim 1, wherein in the step (d), the porous body based on the porous body data after replacement is formed directly by a three-dimensional shaping method.

15. The method for producing the porous body according to claim 1, wherein the step (d) includes the steps of;
- (d1) a step of forming a reverse porous body in which a space voxel is taken as an object and an object voxel is taken as space by a three-dimensional shaping method based on the porous body data after replacement;
- (d2) a step of forming a green porous body by filling the spaces of the reverse porous body with a raw material slurry of the porous body; and
- (d3) a step of burning out the reverse porous body by firing the green porous body to form the porous body.

16. A method for producing a honeycomb filter using the method for producing the porous body according to claim 15,
- wherein in the step (c), porous partition wall data is formed based on the porous body data after replacement, the porous partition wall data being data representing a porous partition wall which forms a plurality of cells serving as flow passages of a fluid, and associating the position information with the voxel type information,
- in the step (d1), a reverse porous partition wall in which a space voxel is taken as an object and an object voxel is taken as space is formed by the three-dimensional shaping method based on the porous partition wall data,
- in the step (d2), a green porous partition wall is formed by filling the spaces of the reverse porous partition wall with the raw material slurry,
- in the step (d3), the reverse porous partition wall is burned out by firing the green porous partition wall to form a porous partition wall which forms the cells each having open both ends,
- the step (d) includes a step (d4) of forming a sealed portion in each of the plurality of cells of the formed porous partition wall so that a cell in which one of the ends is opened and the other is sealed and a cell in which one of the ends is sealed and the other is opened are alternately arranged.

* * * * *